United States Patent
Cho et al.

(10) Patent No.: US 10,362,569 B2
(45) Date of Patent: Jul. 23, 2019

(54) METHOD AND APPARATUS FOR ALLOCATING UPLINK RESOURCE IN WIRELESS COMMUNICATION SYSTEM

(71) Applicant: LG ELECTRONICS INC., Seoul (KR)

(72) Inventors: Heejeong Cho, Seoul (KR); Genebeck Hahn, Seoul (KR); Eunjong Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 15/551,175

(22) PCT Filed: May 22, 2015

(86) PCT No.: PCT/KR2015/005178
§ 371 (c)(1),
(2) Date: Aug. 15, 2017

(87) PCT Pub. No.: WO2016/133247
PCT Pub. Date: Aug. 25, 2016

(65) Prior Publication Data
US 2018/0020431 A1    Jan. 18, 2018

Related U.S. Application Data

(60) Provisional application No. 62/116,569, filed on Feb. 16, 2015.

(51) Int. Cl.
*H04W 72/04* (2009.01)
*H04W 72/12* (2009.01)
(Continued)

(52) U.S. Cl.
CPC ....... *H04W 72/042* (2013.01); *H04W 72/044* (2013.01); *H04W 72/12* (2013.01);
(Continued)

(58) Field of Classification Search
CPC . H04W 72/042; H04W 72/044; H04W 72/12; H04W 72/1242
(Continued)

(56) References Cited

U.S. PATENT DOCUMENTS 8,934,498 B2*   1/2015  Kotecha ............... H04L 1/0026
                                                    370/431
2011/0286419 A1* 11/2011  Cho ................... H04W 72/0413
                                                    370/329
(Continued)

FOREIGN PATENT DOCUMENTS

KR    10-2007-0080541 A     8/2007
KR    10-2010-0026033 A     3/2010
(Continued)

OTHER PUBLICATIONS

Sheu et al; Load Analysis for MTC Devices in Idle Mode or Detached State; 2010; IEEE; 424-428. (Year: 2010).*

*Primary Examiner* — Christopher R Crompton
(74) *Attorney, Agent, or Firm* — Birch, Stewart, Kolasch & Birch, LLP

(57) ABSTRACT

The present specification relates to a method for allocating an uplink resource in a wireless communication system which supports low latency service. The method performed by a terminal comprises the steps of: transmitting, to a base station, a first message comprising an uplink resource request information element (UL resource request IE) to request uplink resource allocation; receiving, from a base station, a second message comprising a response to the UL resource request IE; receiving allocation of the uplink resource from the base station on the basis of the received response; and transmitting a third message to the base station by using the allocated uplink resource.

15 Claims, 22 Drawing Sheets

(51) Int. Cl.
    *H04W 74/00*     (2009.01)
    *H04W 76/10*     (2018.01)
    *H04W 92/10*     (2009.01)
(52) U.S. Cl.
    CPC ...... *H04W 72/1242* (2013.01); *H04W 74/004* (2013.01); *H04W 76/10* (2018.02); *H04W 92/10* (2013.01)
(58) Field of Classification Search
    USPC .......................................................... 370/329
    See application file for complete search history.

(56) References Cited

U.S. PATENT DOCUMENTS

| | | | | |
|---|---|---|---|---|
| 2011/0292895 | A1* | 12/2011 | Wager | H04L 5/0007 370/329 |
| 2014/0179325 | A1 | 6/2014 | Xu et al. | |
| 2014/0307598 | A1* | 10/2014 | Mizusawa | H04W 72/0446 370/280 |
| 2014/0328329 | A1* | 11/2014 | Novlan | H04W 72/042 370/336 |
| 2015/0029923 | A1* | 1/2015 | Xu | H04W 76/28 370/311 |
| 2015/0085689 | A1* | 3/2015 | Vos | H04W 4/70 370/252 |
| 2015/0156006 | A1* | 6/2015 | Takano | H04W 72/042 370/280 |
| 2016/0095018 | A1* | 3/2016 | Vajapeyam | H04W 36/0005 370/331 |
| 2016/0192376 | A1* | 6/2016 | Lee | H04W 48/20 370/252 |
| 2017/0013565 | A1* | 1/2017 | Pelletier | H04W 52/146 |

FOREIGN PATENT DOCUMENTS

| | | |
|---|---|---|
| KR | 10-2010-0089740 A | 8/2010 |
| KR | 10-2014-0066356 A | 6/2014 |

* cited by examiner

[Figure 1]
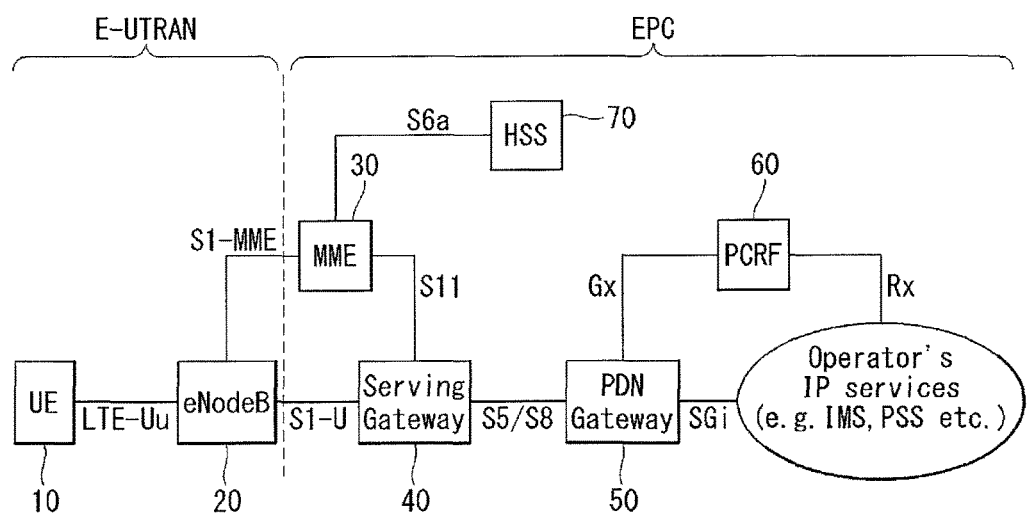

【Figure 2】
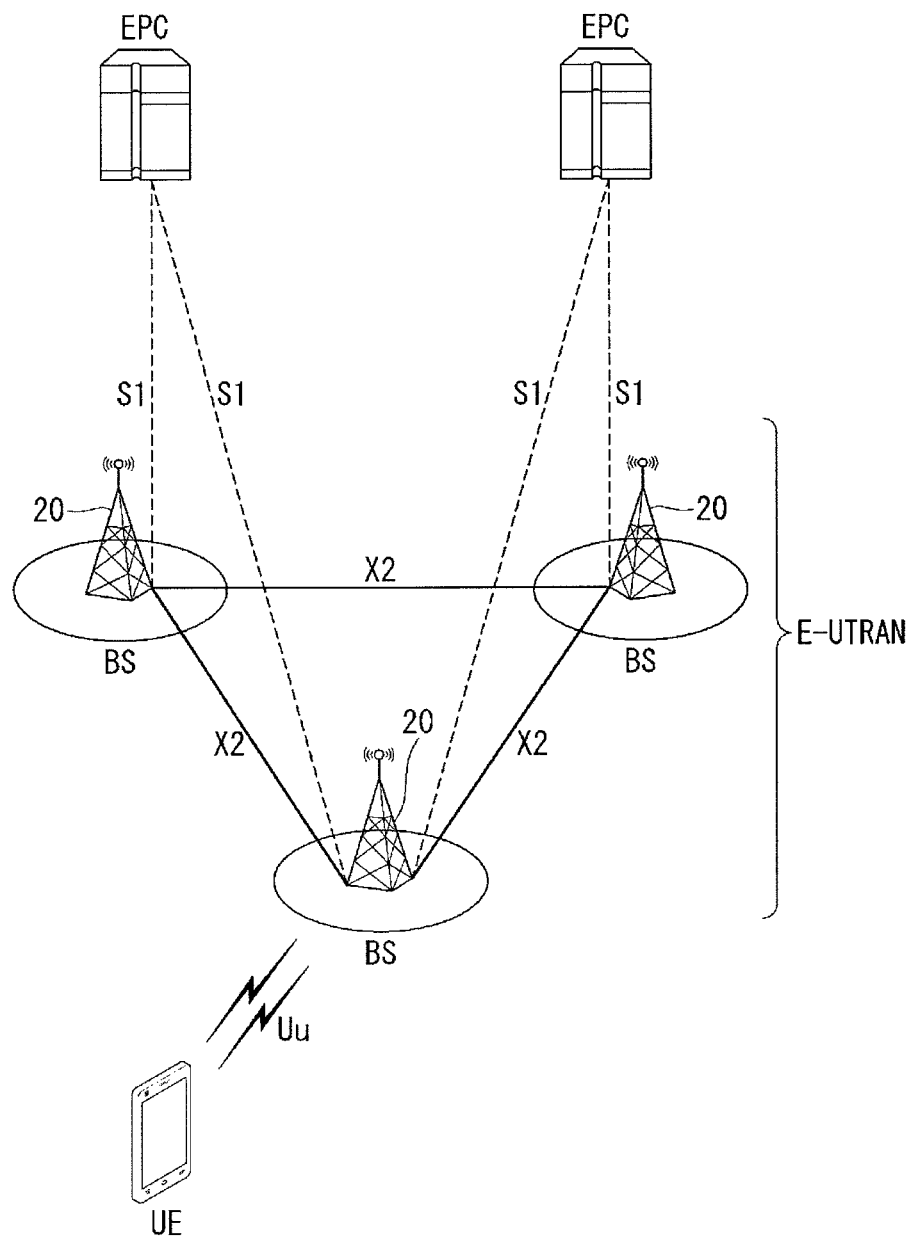

[Figure 3]
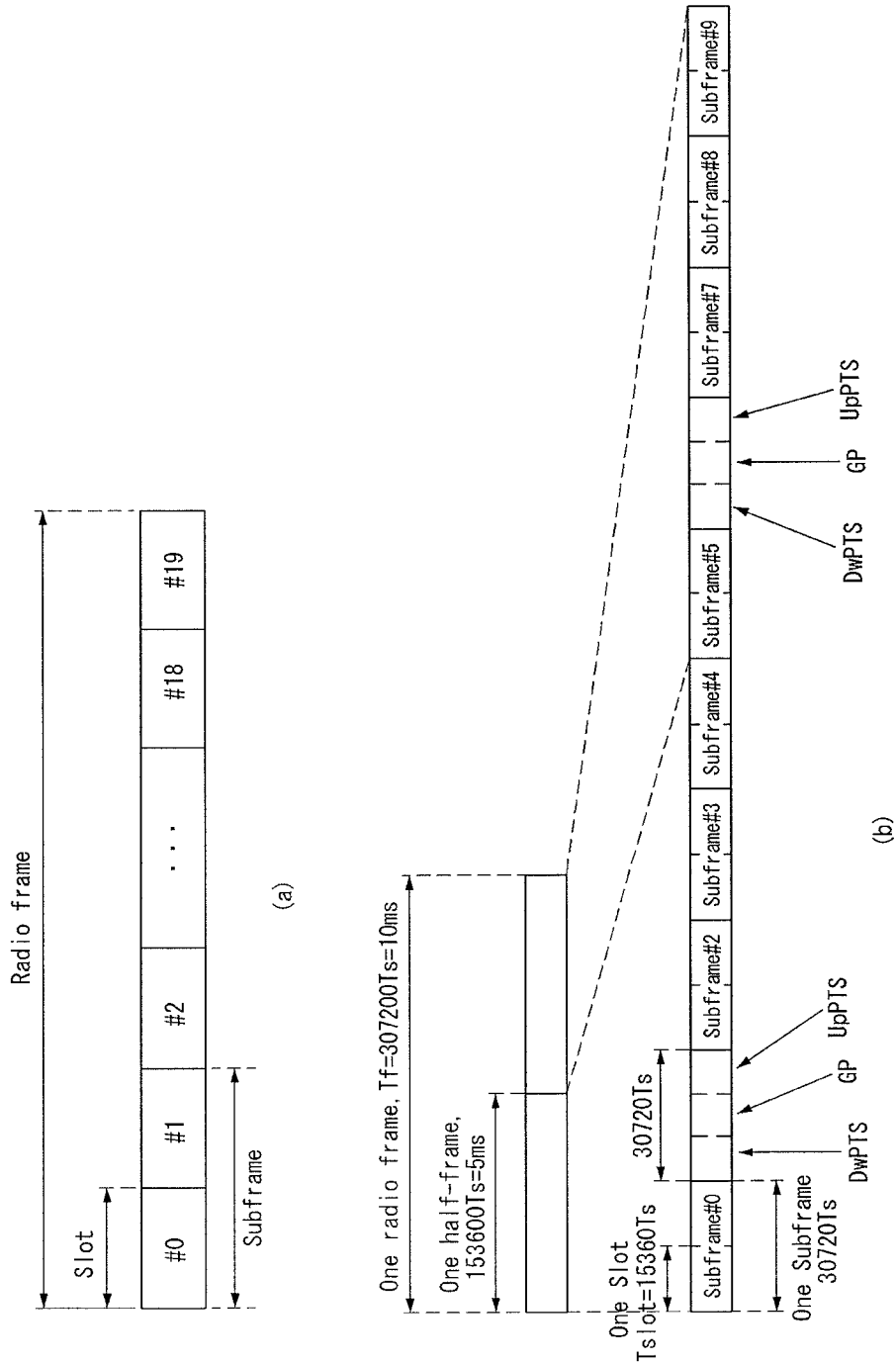

[Figure 4]
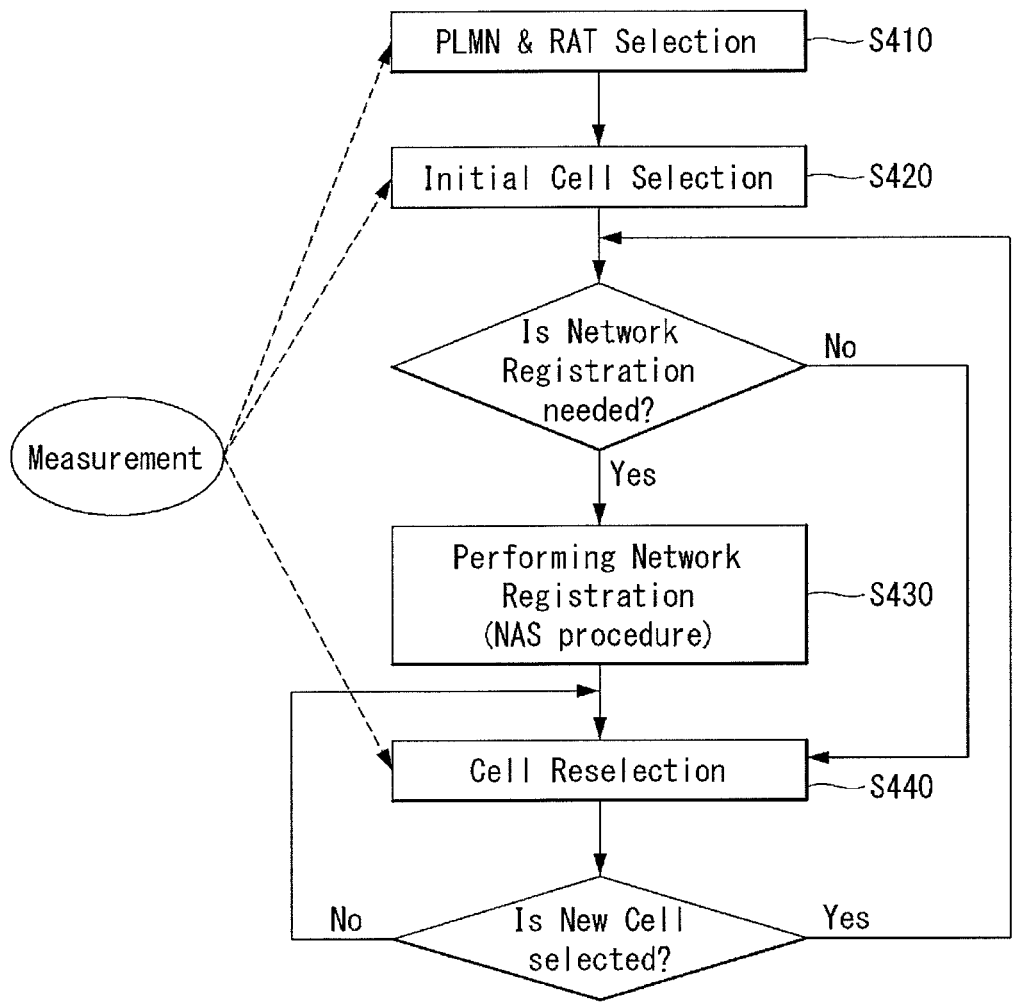

[Figure 5]
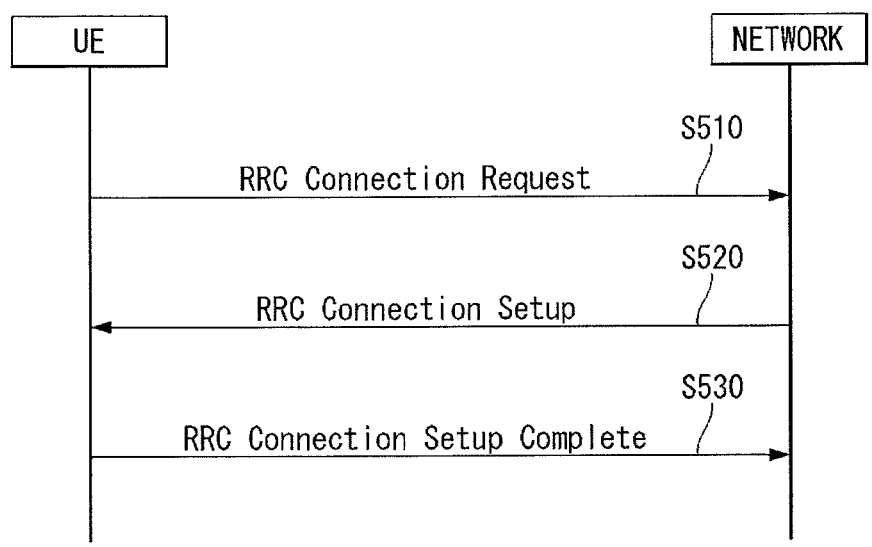

[Figure 6]
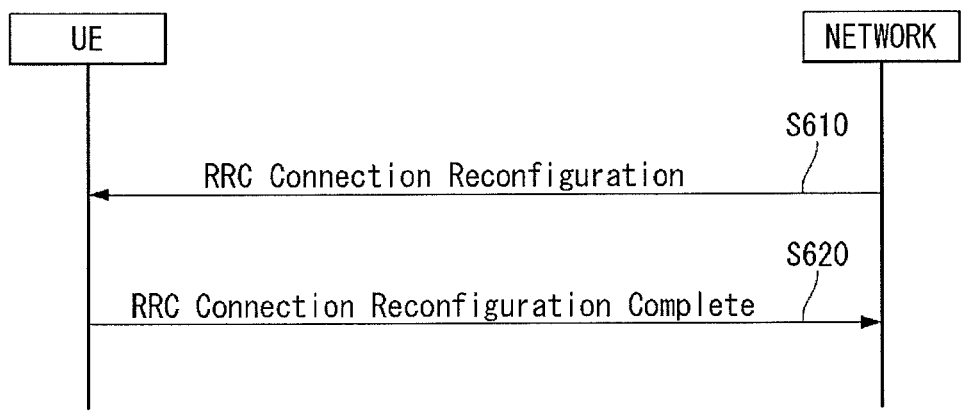

[Figure 7]
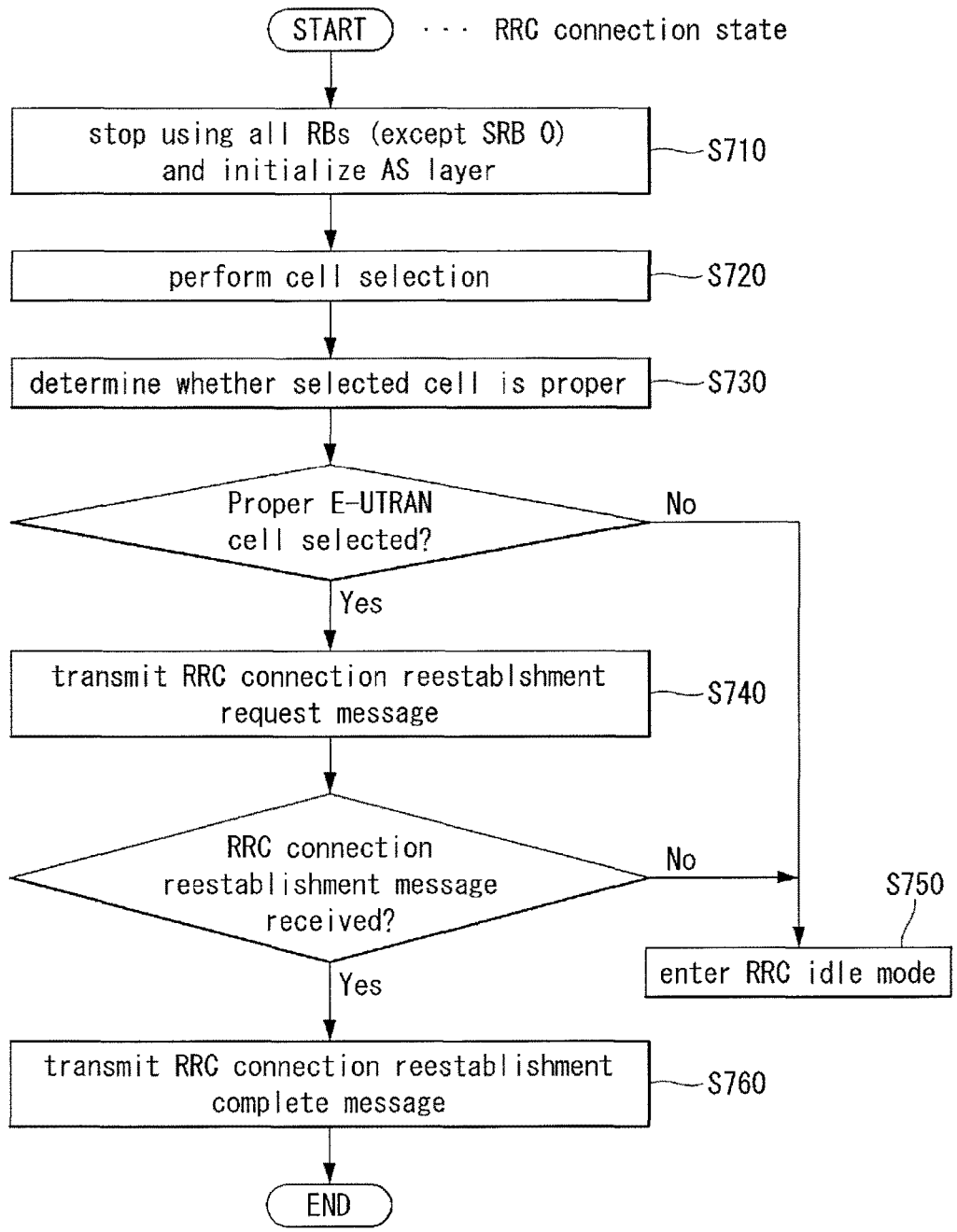

[Figure 8]
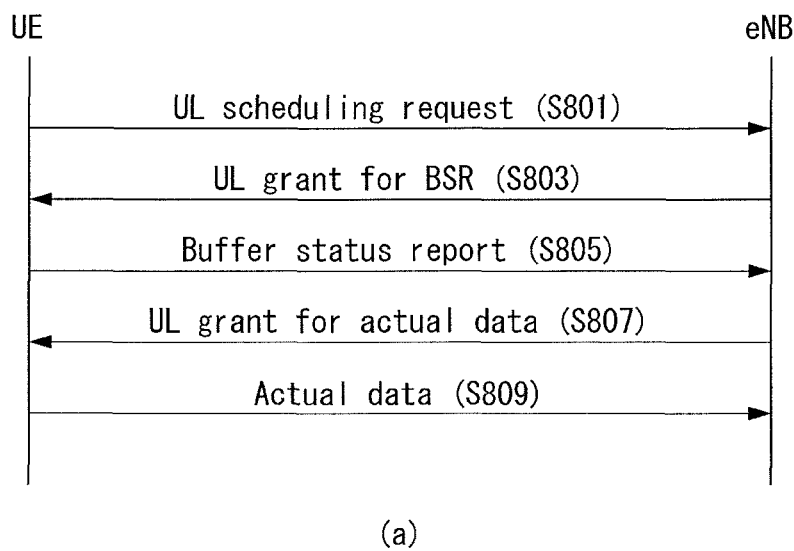
(a)
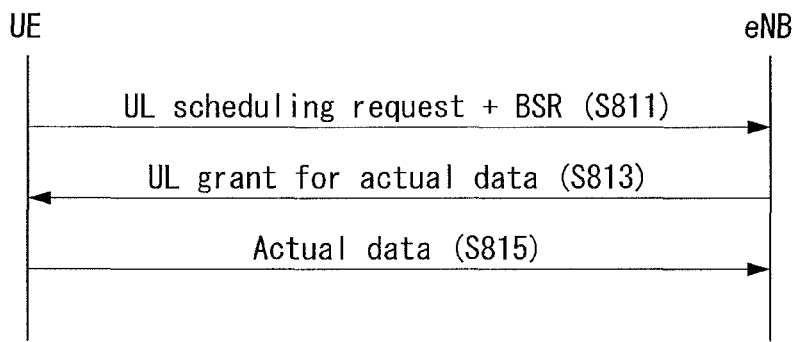
(b)

[Figure 9]
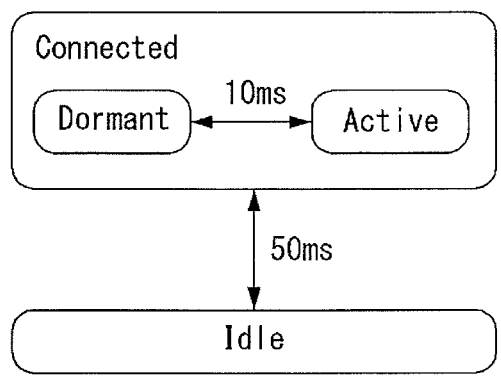

[Figure 10]
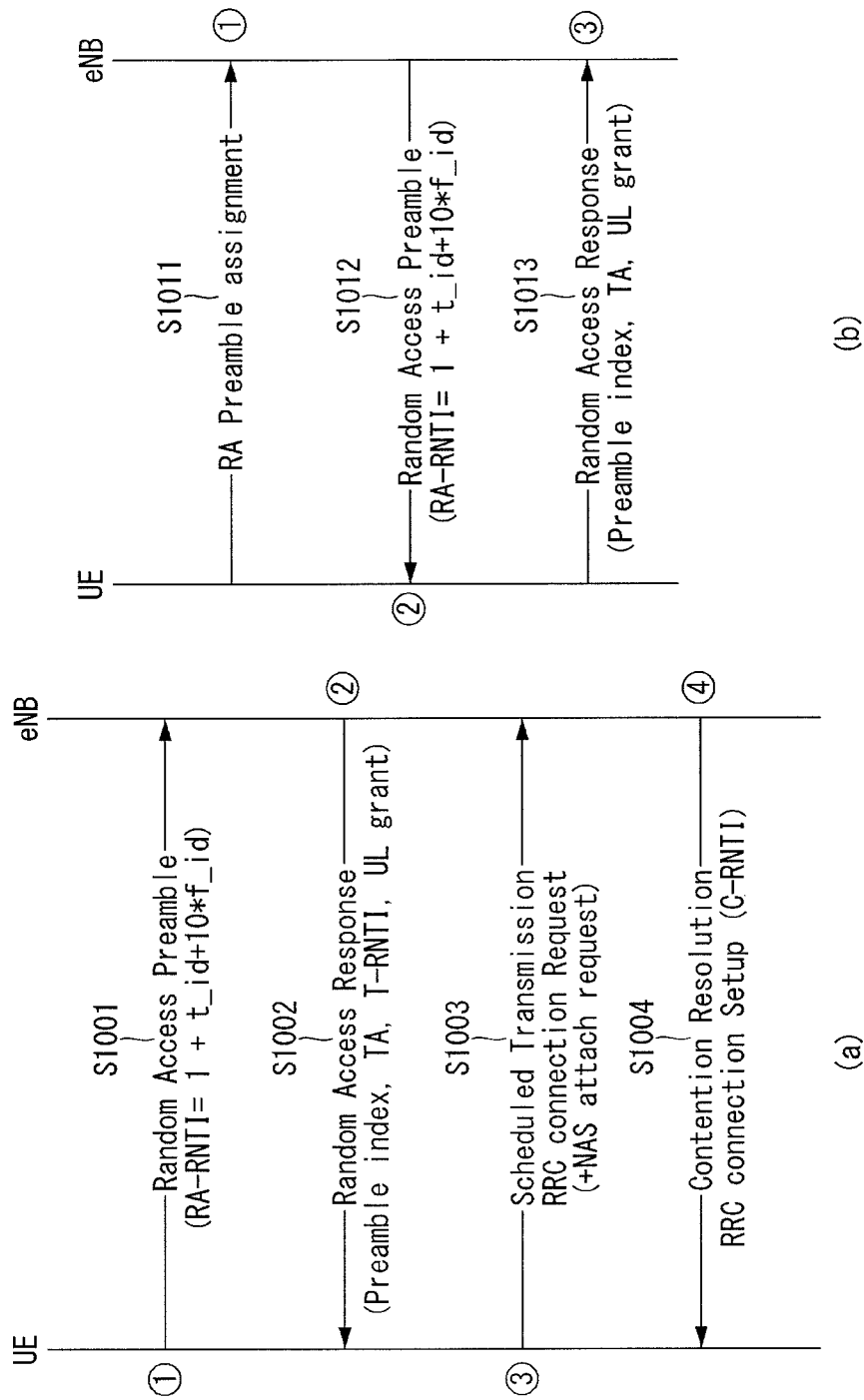

[Figure 11]
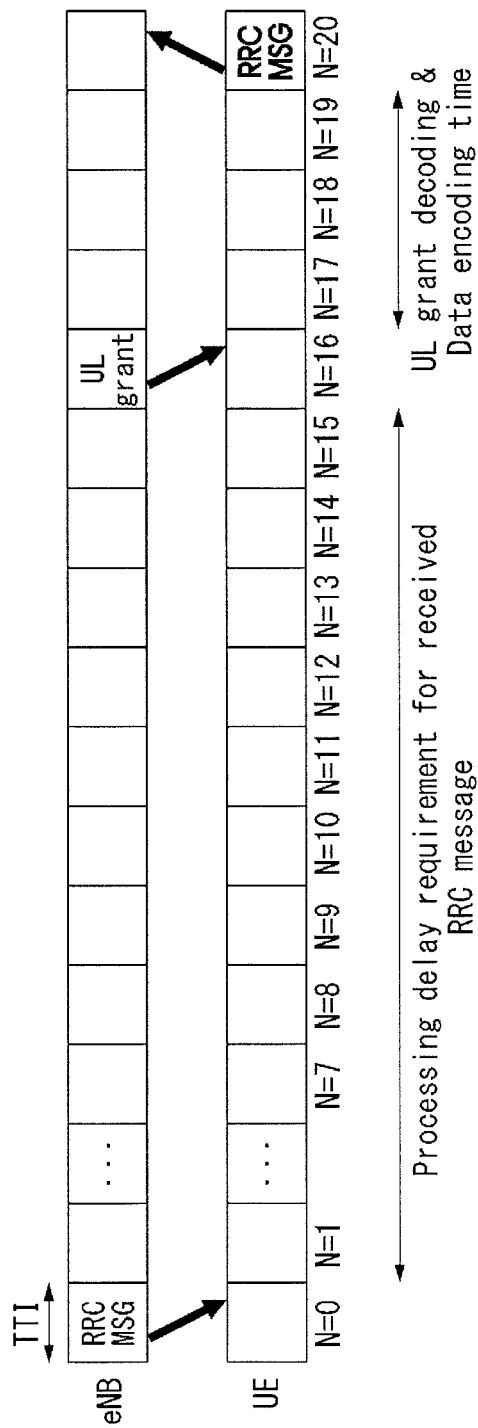

[Figure 12]
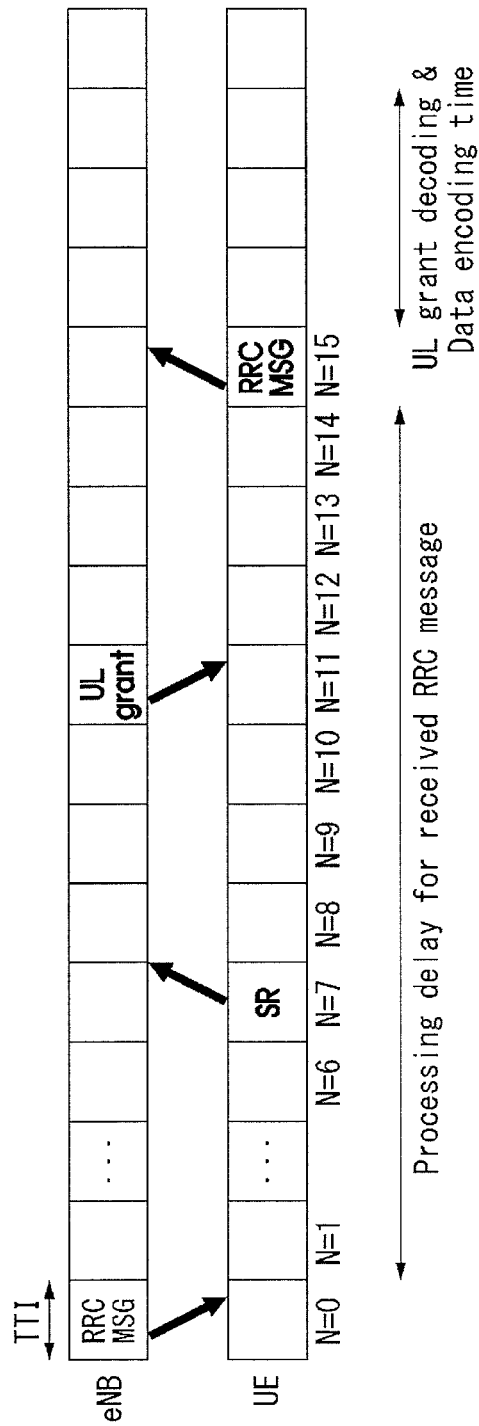

[Figure 13]
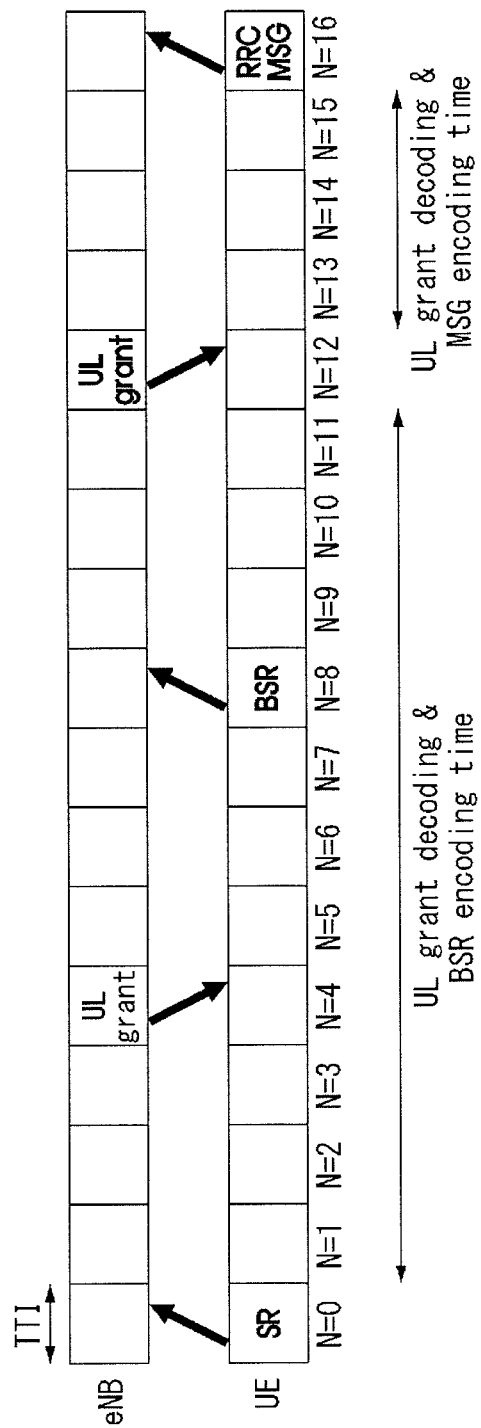

[Figure 14]
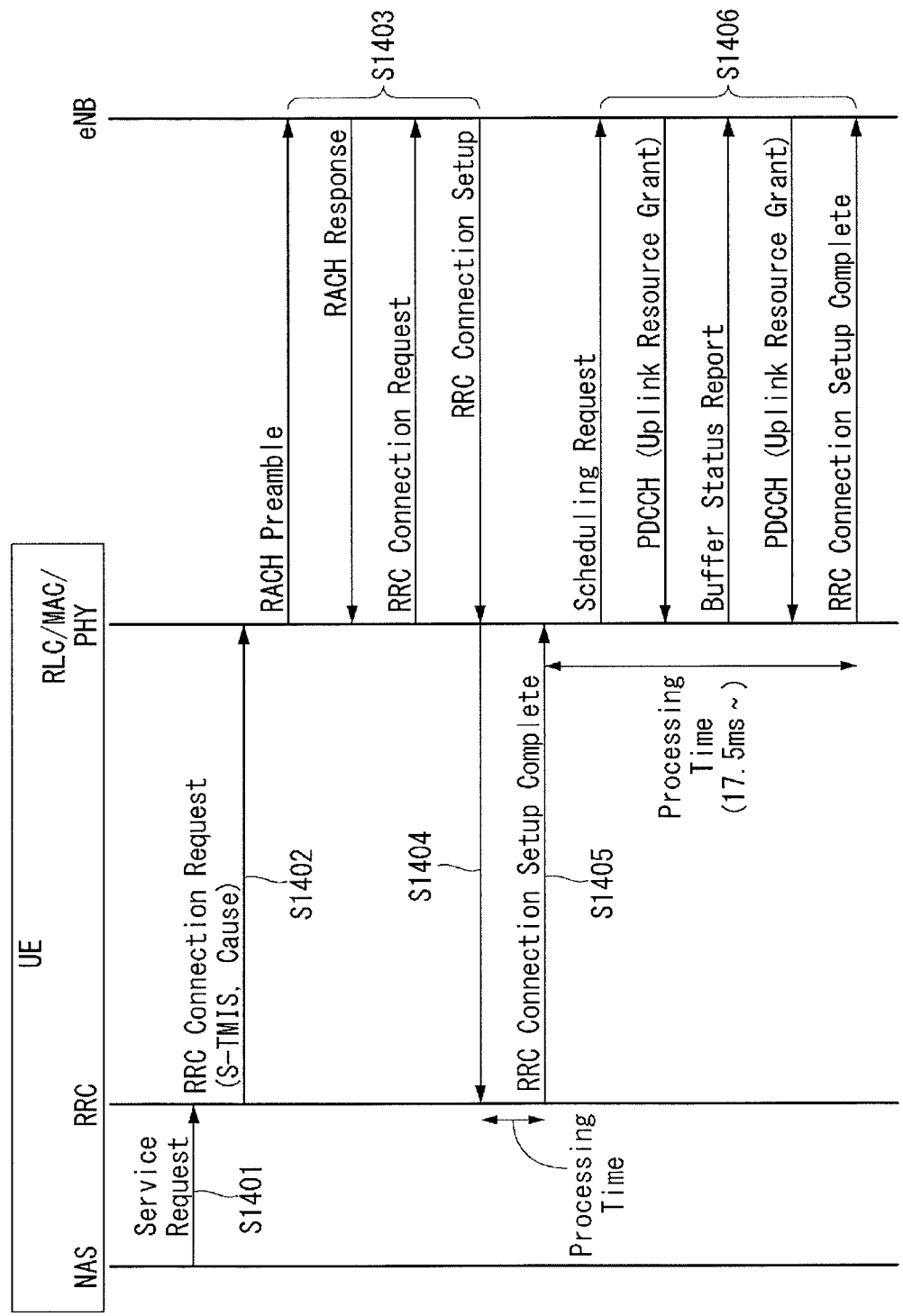

[Figure 15]
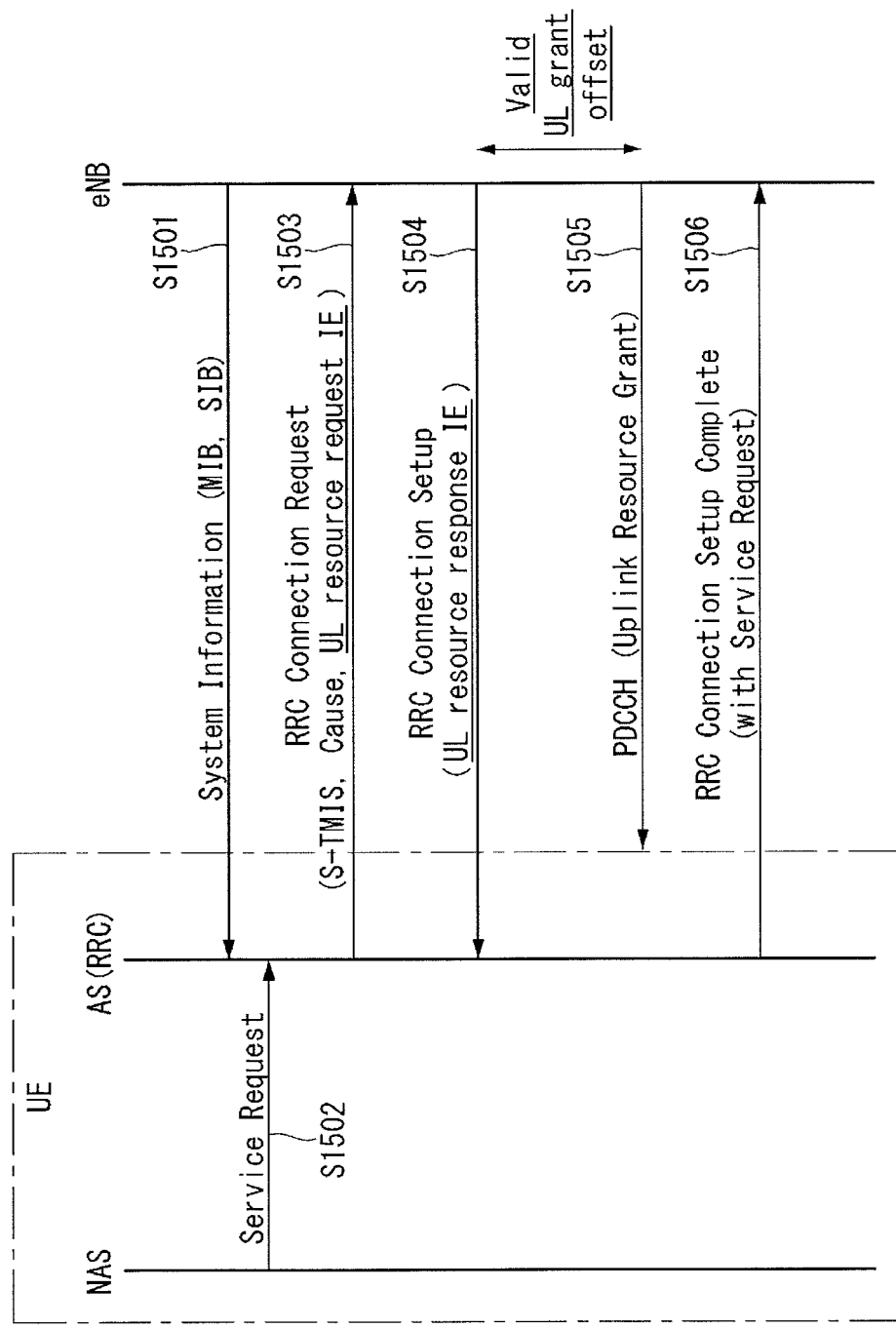

[Figure 16]
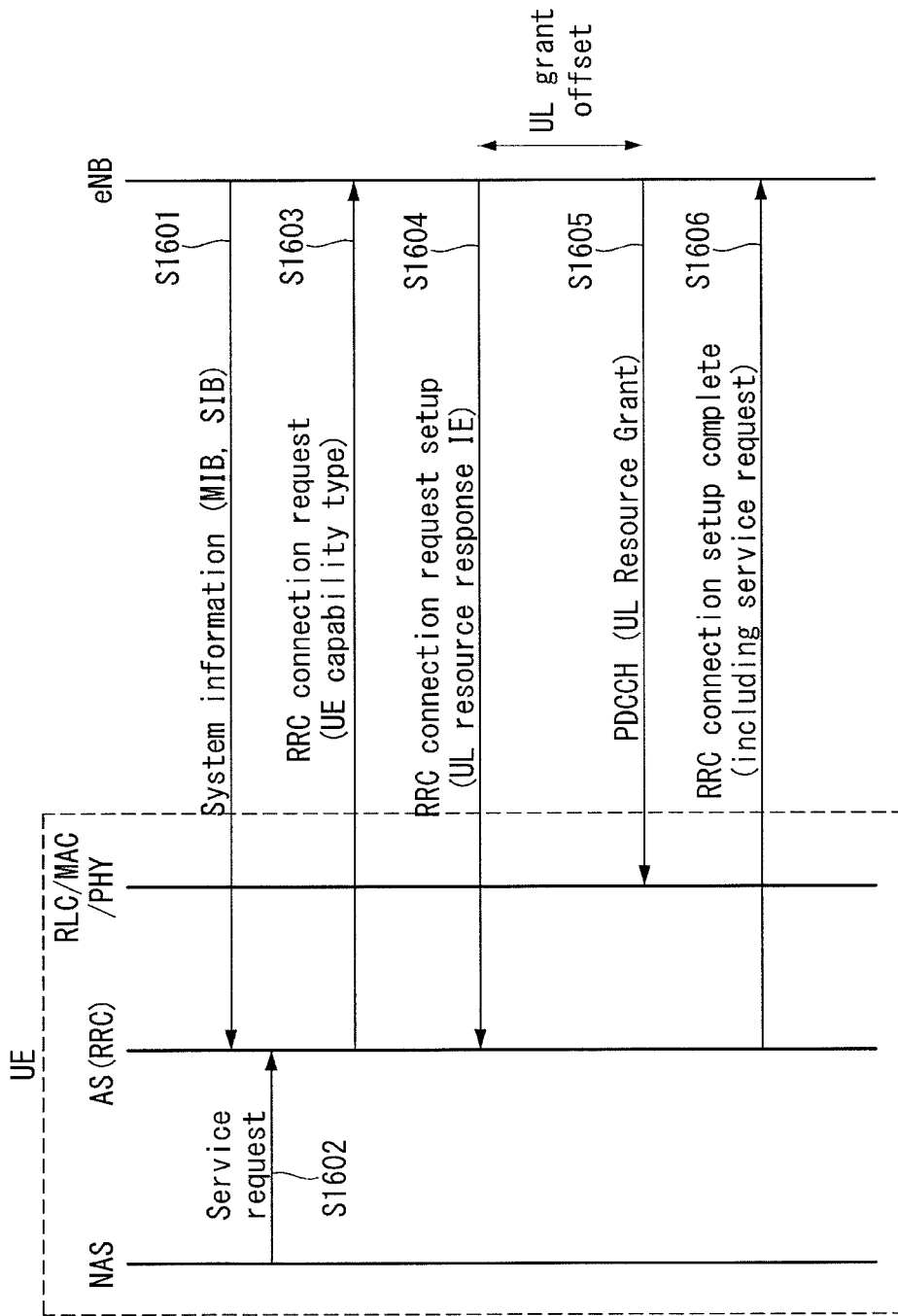

[Figure 17]
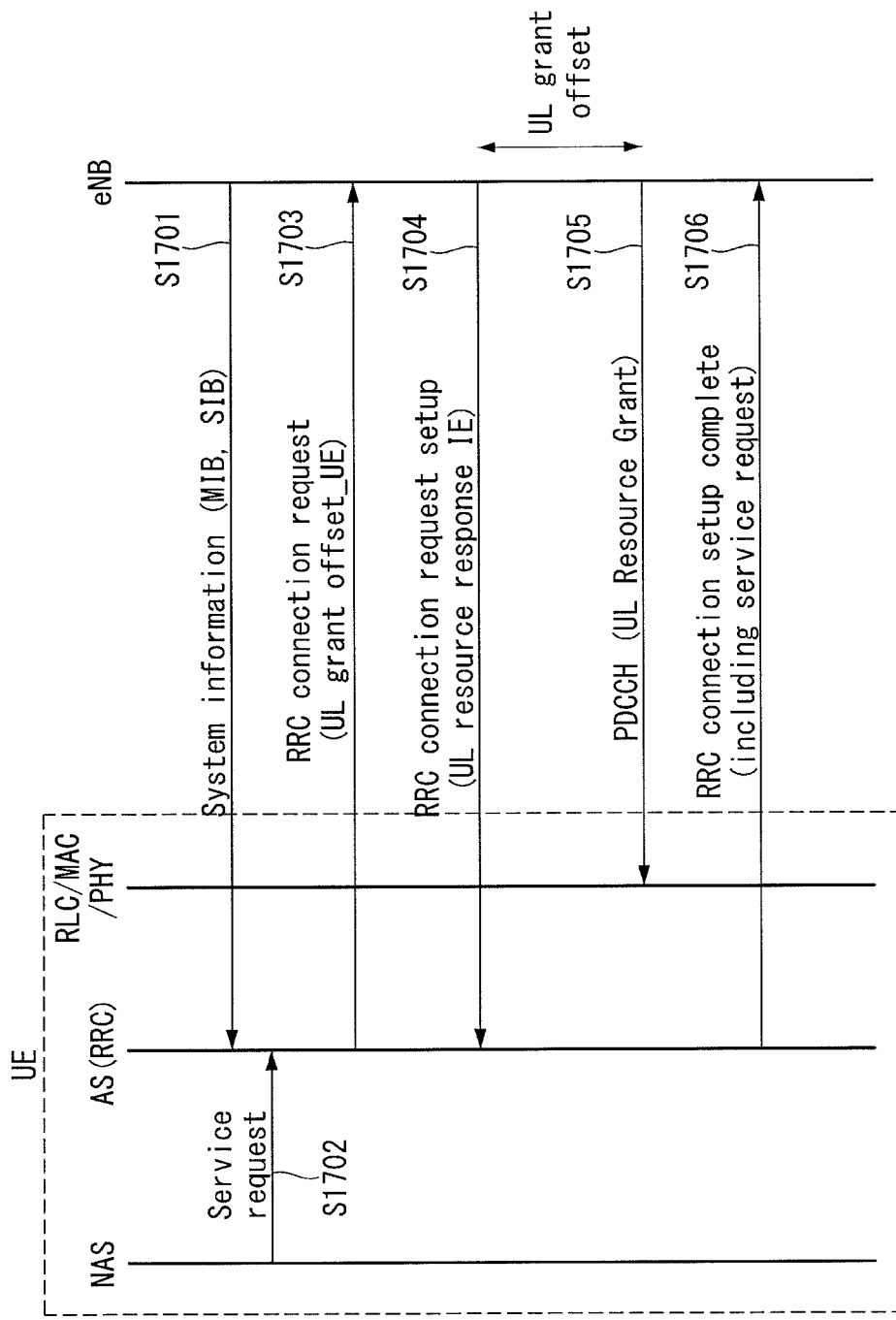

[Figure 18]
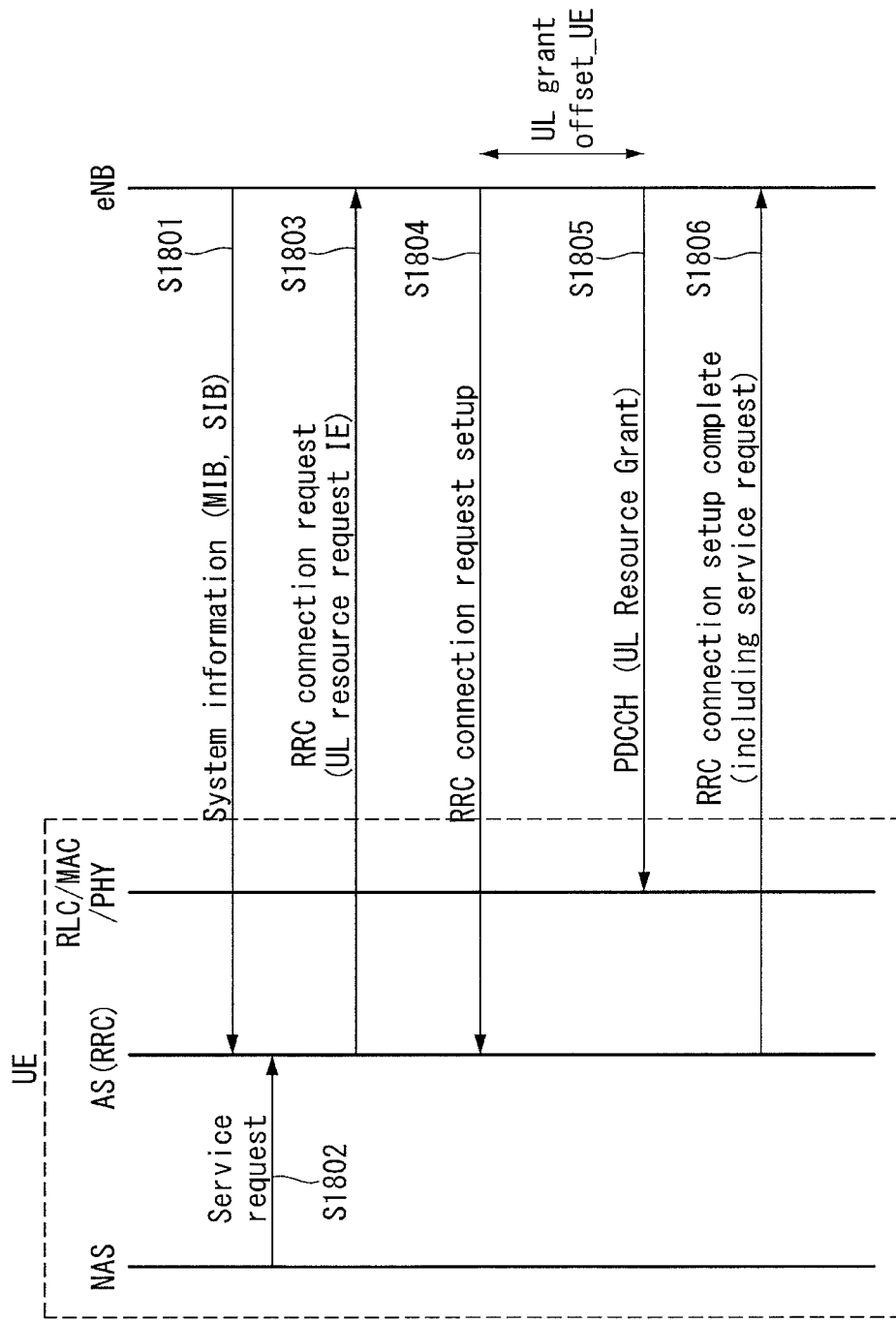

[Figure 19]
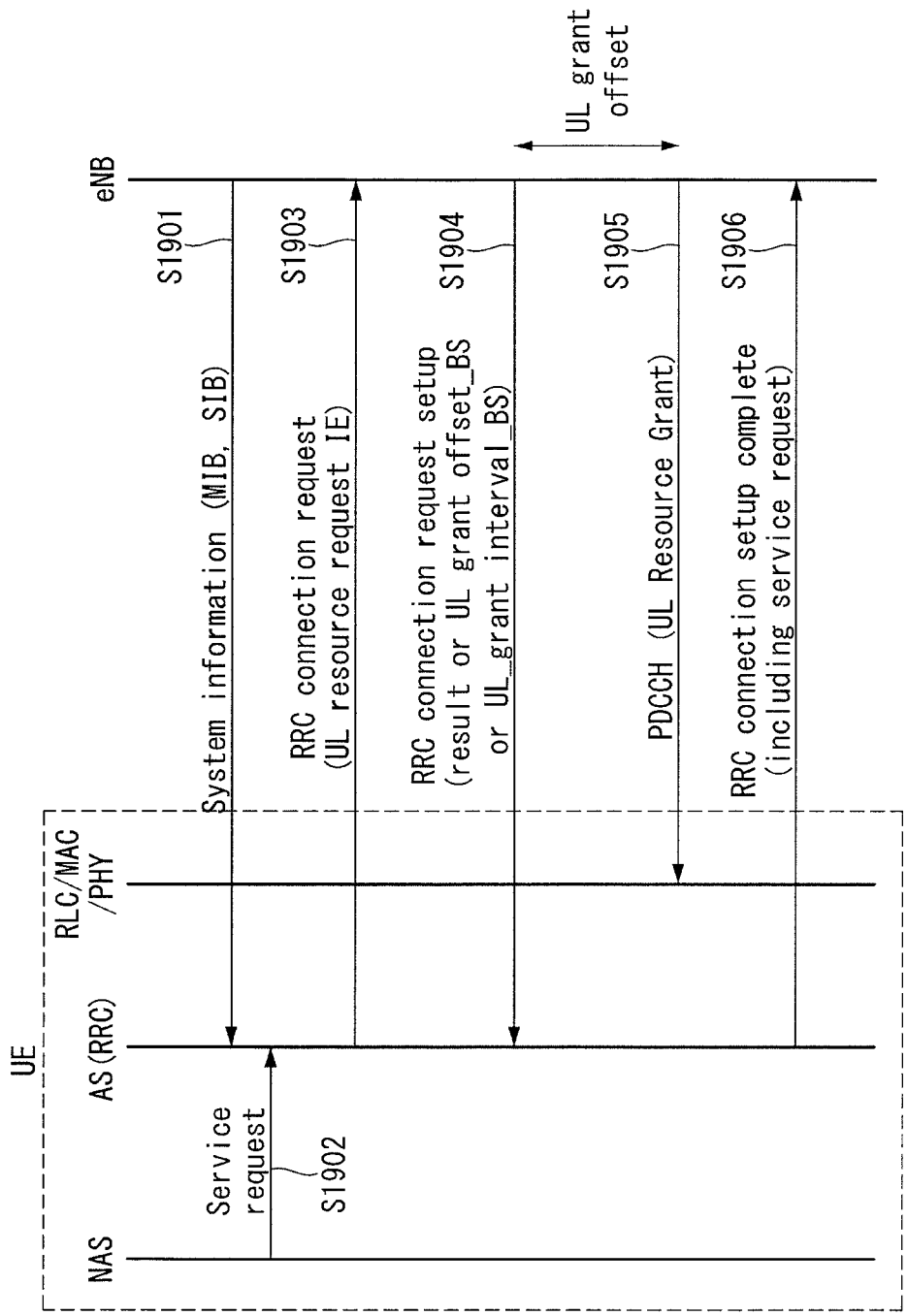

[Figure 20]
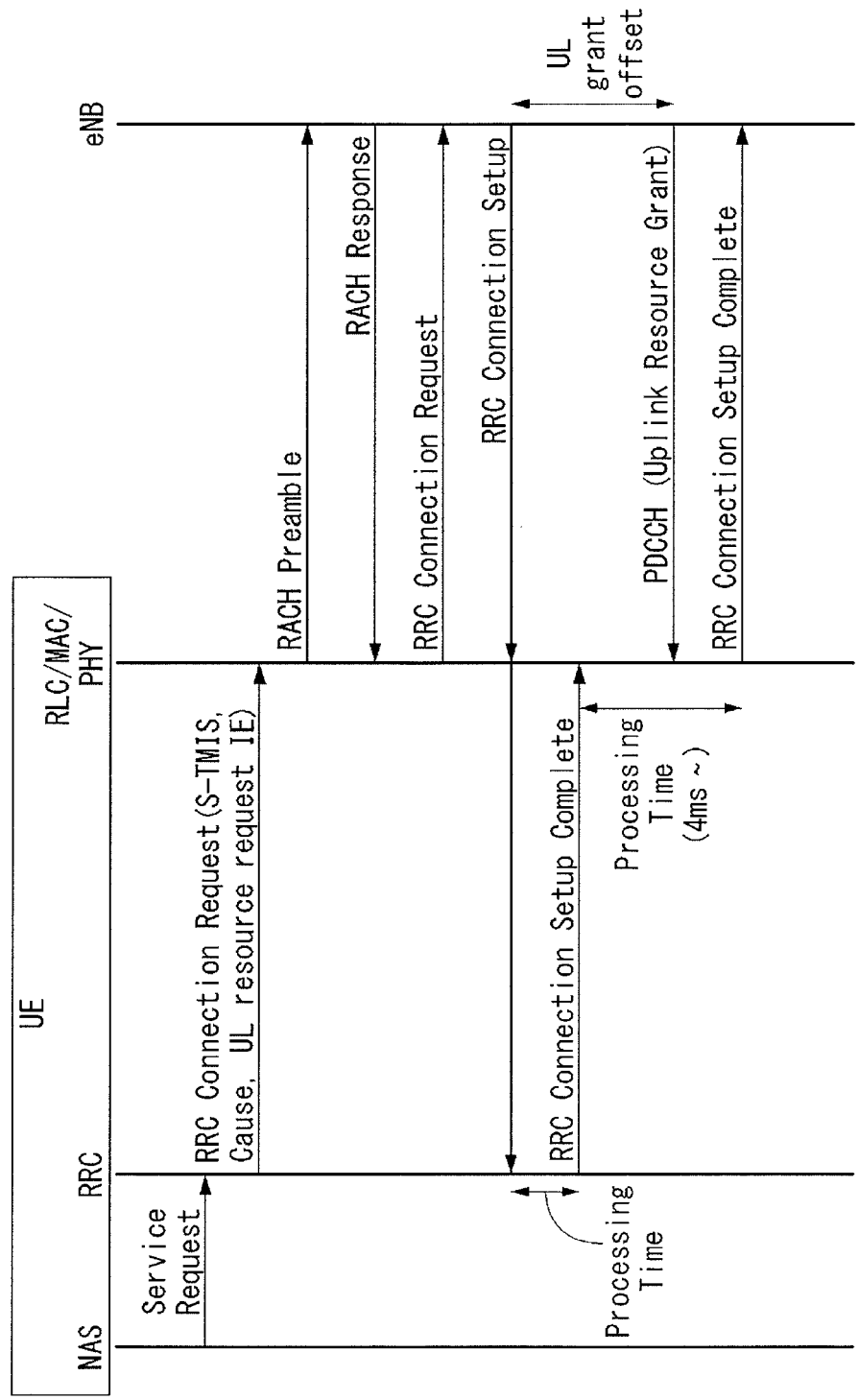

[Figure 21]
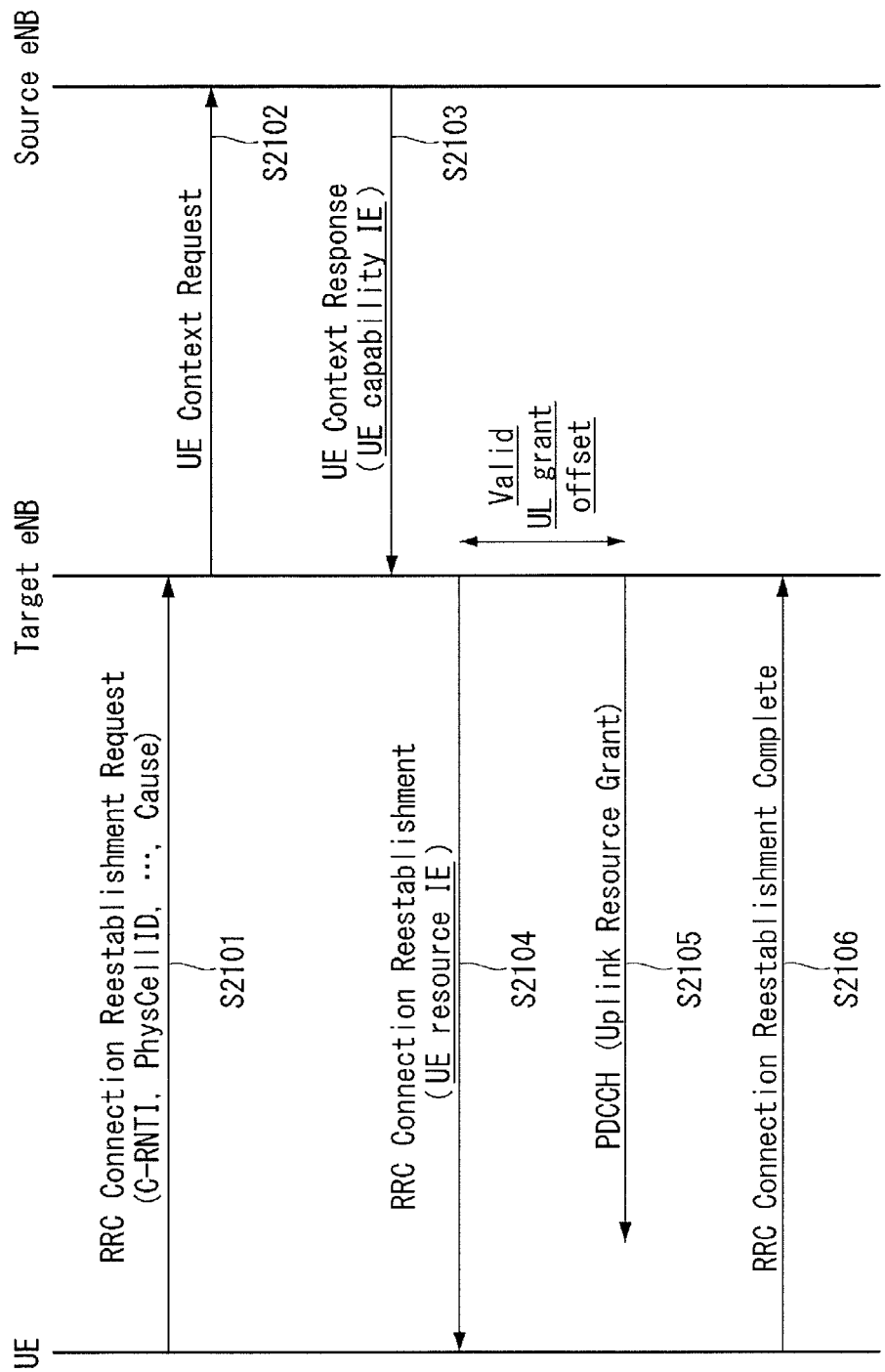

[Figure 22]
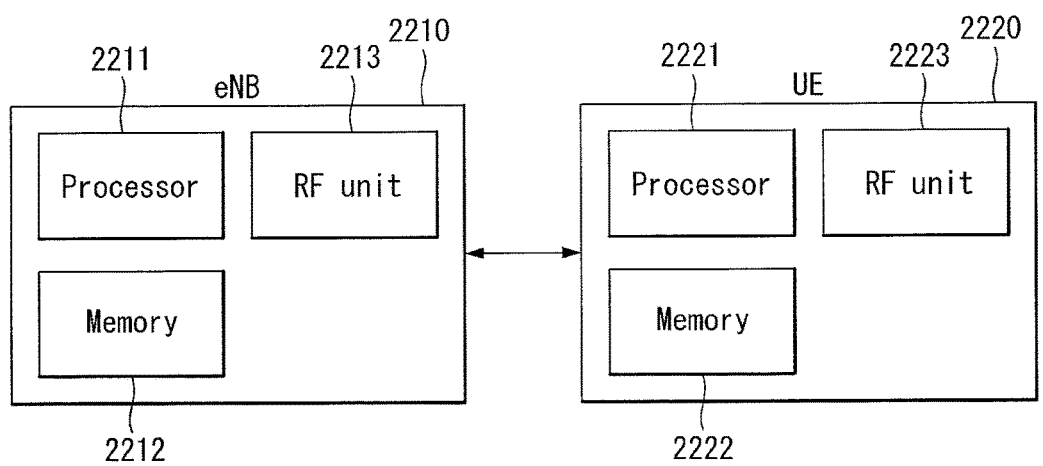

METHOD AND APPARATUS FOR ALLOCATING UPLINK RESOURCE IN WIRELESS COMMUNICATION SYSTEM

CROSS REFERENCE TO RELATED APPLICATIONS

This application is the National Phase of PCT/KR2015/005178 filed on May 22, 2015, which claims priority under 35 U.S.C. § 119(e) to U.S. Provisional Application No. 62/116,569 filed on Feb. 16, 2015, all of which are hereby expressly incorporated by reference into the present application.

TECHNICAL FIELD

This specification relates to a wireless communication system and, more particularly, to an uplink (UL) resource allocation method for a user equipment to transmit UL data to an evolved nodeB (eNB) and an apparatus supporting the same.

BACKGROUND ART

Mobile communication systems have been developed to provide a voice service while ensuring mobility of users. The mobile communication system has evolved to provide a data service in addition to the voice service. These days, due to explosive growth of traffic, communication resources are easily running short. Also, since demand for higher speed services is great, needs for more advanced mobile communication systems are getting larger.

Requirements for the next-generation mobile communication system largely include accommodation of explosive data traffic, considerable increase of transmission rate for each user, accommodation of the significantly increased number of connected devices, very low end-to-end latency, and high energy efficiency. To meet the requirements, various technologies such as dual connectivity, massive multiple input multiple output (MIMO), in-band full duplex, non-orthogonal multiple access (NOMA), support for super-wideband communication, and device networking are being studied.

DISCLOSURE

Technical Problem

An object of this specification is to provide an UL resource grant method for a fast RRC connection setup in order to reduce transmission latency of a low latency service.

Furthermore, an object of this specification is to provide an UL resource request method using previously defined UL resource grant time information depending on the capability type of a UE.

Furthermore, an object of this specification is to provide a method for implicitly or explicitly transmitting a result or response of the UL resource request of a UE.

Furthermore, an object of this specification is to provide a method using a conventional UL resource grant method if the UL resource request of a UE fails.

Furthermore, an object of this specification is to provide an UL resource grant method different from a conventional technology in terms of other procedures, such as an RRC connection reestablishment procedure, in addition to an RRC connection setup procedure.

Technical objects to be achieved by this specification are not limited to the aforementioned objects, and those skilled in the art to which the present invention pertains may evidently understand other technological objects from the following description.

Technical Solution

In this specification, a method of allocating uplink (UL) resources in a wireless communication system supporting a low latency service is performed by a user equipment (UE), and includes the steps of transmitting a first message including an UL resource request information element (IE) for requesting an UL resource grant to an evolved nodeB (eNB); receiving a second message including a response to the UL resource request IE from the eNB; receiving UL resources allocated by the eNB based on the received response; and transmitting a third message to the eNB through the allocated UL resources. The UL resource request IE includes at least one of a UE capability type field indicative of the capability of the UE accessing the eNB, an UL grant offset field indicative of a point of time at which the UE requests the UL resources, and an UL grant size field indicative of the size of data to be transmitted through the UL resources.

Furthermore, in this specification, the UL resource request information element (IE) further includes at least one of a cause field indicative of an UL resource request for a low delay service and a device type field indicative of the type of UE.

Furthermore, in this specification, the UL resources are allocated based on a previously defined processing delay value and an UL grant offset value depending on the UE capability type.

Furthermore, in this specification, the UL grant offset value has a value identical with or greater than a maximum value of the processing delay value.

Furthermore, in this specification, if the UL resource request IE includes the UL grant offset value, the UL resources are allocated at a point of time after the UL grant offset value from a point of time at which the second message is transmitted.

Furthermore, in this specification, the response includes information related to the acceptance, rejection or change of the UL resource grant at a point of time or interval in which the UE requests the UL resources.

Furthermore, in this specification, if the response indicates rejection, the UL resources are allocated through a scheduling request (SR) or allocated through a scheduling request (SR) and a buffer status report (BSR).

Furthermore, in this specification, the step of receiving the allocated UL resources including a step of monitoring a physical downlink control channel (PDCCH) through which the UL resources are transmitted.

Furthermore, in this specification, the first message is a radio resource control (RRC) connection request message, the second message is an RRC connection setup message, and the third message is an RRC connection setup complete message.

Furthermore, in this specification, the UE has an idle state.

Furthermore, in this specification, a method of allocating uplink (UL) resources in a wireless communication system supporting a low latency service is performed by an evolved nodeB (eNB) and includes the steps of receiving an RRC connection reestablishment request message including user equipment (UE) ID information from a UE; receiving a UE capability information element (IE) including information related to the capability of the UE from a second eNB based on the UE ID information; transmitting an RRC connection reestablishment request message including an UL resource IE regarding an UL resource grant to the UE based on the received UE capability IE; allocating UL resources to the UE at a specific point of time; and receiving an RRC connection reestablishment complete message from the UE through the allocated UL resources.

Furthermore, this specification further includes a step of transmitting a UE context request message for requesting the UE capability IE to the second eNB, wherein the UE capability IE is included in a UE context response message and received.

Furthermore, in this specification, the UE capability IE includes at least one of a UE capability type field indicative of the capability of the UE and owned by the second eNB, an UL grant offset field indicative of a point of time at which the UE requests the UL resources, and an urgent indicator field indicating whether a low delay service is provided or not between the second eNB and the UE.

Furthermore, in this specification, the specific point of time includes a point of time after the UL grant offset from a point of time at which the RRC connection reestablishment request message is transmitted.

Furthermore, in this specification, the UL resource IE further includes information related to the acceptance, rejection or change of the UL resource grant at a point of time or interval in which the UE requests the UL resources.

Furthermore, in this specification, the first eNB is a target eNB, and the second eNB is a source eNB.

Furthermore, in this specification, the UE has a connected state.

Furthermore, in this specification, a user equipment (UE) for performing an uplink (UL) resource grant in a wireless communication system supporting a low latency service includes a communication unit transmitting and receiving radio signals to and from the outside; and a processor functionally coupled to the communication unit. The processor performs control so that a first message including an UL resource request information element (IE) for requesting an UL resource grant is transmitted to an evolved nodeB (eNB), a second message including a response to the UL resource request IE is received from the eNB, UL resources allocated by the eNB is received based on the received response, and a third message is transmitted to the eNB through the allocated UL resources. The UL resource request IE includes at least one of a UE capability type field indicative of the capability of the UE accessing the eNB, an UL grant offset field indicative of a point of time at which the UE requests the UL resources, and an UL grant size field indicative of the size of data to be transmitted through the UL resources.

Advantageous Effects

This specification has an effect in that transmission latency which may occur in a low latency service can be reduced through the UL resource grant method for a fast RRC connection configuration.

Furthermore, this specification has an effect in that power consumption of a UE can be reduced because a UE monitors a PDCCH through which an UL grant is transmitted only at a point of time or interval in which UL resources are allocated.

Effects which may be obtained by this specification are not limited to the aforementioned effects, and various other effects may be evidently understood by those skilled in the art to which the present invention pertains from the following description.

DESCRIPTION OF DRAWINGS

FIG. 1 is a diagram illustrating an evolved packet system (EPS) related to an LTE system to which an embodiment of the present invention may be applied.

FIG. 2 shows a wireless communication system to which an embodiment of the present invention may be applied.

FIG. 3 shows the structure of a radio frame in 3GPP LTE/LTE-A to which an embodiment of the present invention may be applied.

FIG. 4 is a flowchart illustrating the operation of a UE in the RRC idle state to which an embodiment of the present invention may be applied.

FIG. 5 is a flowchart illustrating a process of establishing an RRC connection to which an embodiment of the present invention may be applied.

FIG. 6 is a flowchart illustrating an RRC connection reestablishment process to which an embodiment of the present invention may be applied.

FIG. 7 is a diagram illustrating an RRC connection reestablishment procedure to which an embodiment of the present invention may be applied.

FIG. 8 is a diagram illustrating a process of allocating UL resources to a UE in a wireless communication system to which an embodiment of the present invention may be applied.

FIG. 9 is a diagram for illustrating latency in a control plane (c-plane) required in 3GPP LTE-A to which an embodiment of the present invention may be applied.

FIGS. 10*a* and 10*b* shows examples of a random access procedure in an LTE system.

FIG. 11 is a diagram showing an example of a method of allocating UL resources without a scheduling request (SR) from a UE.

FIG. 12 is a diagram showing an example of a method of allocating UL resources in response to an SR from a UE.

FIG. 13 is a diagram showing an example of a method of allocating UL resources through the SR and buffer status report (BSR) of a UE.

FIG. 14 is a diagram illustrating a conventional UL resource grant method.

FIG. 15 is a diagram showing an example of an UL resource allocating method proposed by this specification.

FIG. 16 is a diagram showing an example of a method of allocating UL resources in response to an UL resource request according to the capability type of a UE, which is proposed by this specification.

FIG. 17 is a diagram showing an example of a method of allocating UL resources in response to an UL resource request according to an UL grant offset, which is proposed by this specification.

FIGS. 18 and 19 are diagrams showing examples of a method for an eNB to respond to an UL resource request from a UE, which is proposed by this specification.

FIG. 20 is a diagram showing an UL resource grant method proposed by this specification and a reduction of corresponding transmission latency.

FIG. 21 is a diagram illustrating another example of an UL resource grant method proposed by this specification.

FIG. 22 is an internal block diagram showing a wireless apparatus in which the methods proposed by this specification may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In this specification, a base station has a meaning as a terminal node of a network directly communicating with a terminal. In this document, a specific operation described as being performed by a base station may be performed by an upper node of a base station. Namely, it is evident that, in a network including a plurality of network nodes including a base station, various operations performed for communication with a terminal may be performed by the base station or network nodes other than the base station. The base station (BS) may be replaced with a term, such as a 'fixed station', a 'Node B', a evolved-NodeB (eNB), a 'base transceiver system (BTS)', an 'access point (AP)', a 'macro eNB (MeNB)' or a 'secondary eNB (SeNB)'.

Furthermore, a 'terminal" may be fixed or mobile and may be replaced with a term, such as a 'user equipment (UE)', a 'mobile station (MS)', a 'user terminal (UT)', a 'mobile subscriber station (MSS)', a 'subscriber station (SS)', an 'advanced mobile station (AMS)', a 'wireless terminal (WT)', a 'machine-type communication (MTC) device', a 'machine-to-machine (M2M) device', a 'device-to-device (D2D) device' or a wireless device.

In the following, "downlink (DL)" refers to communication from an eNB to a UE, and "uplink (UL)" refers to communication from a UE to an eNB. In downlink, a transmitter may be a part of an eNB and a receiver may be part of a UE. In uplink, a transmitter may be a part of a UE and a receiver may be part of an eNB.

Specific terms used in the embodiments of the present invention have been provided to help understanding of the present invention. These specific terms may be changed in other terms without departing from the technological spirit of the present invention.

The following technologies may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA) and 'non-orthogonal multiple access (NOMA)'. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 is a view illustrating an Evolved Packet System (EPS) related to a Long Term Evolution (LTE) system to which the present invention may be applied.

The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC also referred to as a core network (CN) controls a UE and manages the establishment of bearers.

As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is a control node processing signaling between the UE and the CN. T Protocols exchanged between the UE and the CN are known as Non-Access Stratum (NAS) protocols. Examples of functions supported by the MME 10 include functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as a local mobility anchor for data bearers when the UE moves between eNodeBs. All user IP packets are transferred through the S-GW 20. The S-GW 20 also retains information about a bearer when the UE is in the idle state known as ECM-IDLE and temporarily buffers downlink data while the MME initiates paging of the UE to re-establish the bearer. Further, the S-GW also serves as a mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50 is also referred to as a Home Location Register (HLR), and contains users' SAE subscription data, such as the EPS-subscribed QoS profile and any access restrictions for roaming. Further, the HSS also holds information about the PDNs to which the user may connect. This may be in the form of an Access Point Name (APN), which is a label according to DNS (Domain Name system) naming conventions describing the access point to the PDN, or a PDN Address which indicates subscribed IP addresses.

As shown in FIG. 1, various interfaces, such as an S1-U, S1-MME, S5/S8, S11, S6a, Gx, Rx and SG, are defined between the EPS network elements.

Hereinafter, the concept of mobility management (MM) and a mobility management (MM) back-off timer are described in detail. The mobility management (MM) is a procedure for reducing overhead in the E-UTRAN and processing in a UE.

If the mobility management (MM) is applied, all pieces of information related to a UE in the access network may be released during the period in which data is inactive. The MME may retain UE context and information related to an established bearer during the idle period.

To allow a network to contact a UE in the ECM-IDLE, the UE may notify the network of its new location whenever the UE moves out of a current Tracking Area (TA). This procedure may be called a 'Tracking Area Update'. This procedure may be called a 'Routing Area Update' in a universal terrestrial radio access network (UTRAN) or GSM EDGE Radio Access Network (GERAN) system. The MME serves to keep track of the user location while the UE is in the ECM-IDLE state.

If there is downlink data to be delivered to the UE in the ECM-IDLE state, the MME transmits a paging message to all of eNodeBs in a tracking area (TA) with which the UE has been registered.

Thereafter, an eNB starts to page the UE over the radio interface. When the paging message is received, the UE performs a certain procedure which shits the state of the UE to an ECM-CONNECTED state. This procedure may be called a 'Service Request Procedure'. Accordingly, UE-related information is generated in the E-UTRAN, and all of the bearers are re-established. The MME functions to re-establish the radio bearers and to update UE context in the eNodeB.

If the aforementioned mobility management (MM) is performed, a mobility management (MM) back-off timer may be further used. Specifically, the UE may transmit a Tracking Area Update (TAU) in order to update the TA, and the MME may reject a TAU request due to the congestion of a core network. In this case, the MME may provide a time value related to the MM back-off timer. When the time value is received, the UE may activate the MM back-off timer.

FIG. 2 illustrates a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

The layers of a radio interface protocol between the UE and the network may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a radio frame structure defined in 3GPP LTE/LTE-A to which the present invention may be applied.

In the cellular OFDM wireless packet communication system, the transmission of uplink/downlink data packets is carried out in units of subframes, and one subframe is defined as a predetermined time period including a plurality of OFDM symbols. The 3GPP LTE/LTE-A standard supports a type 1 radio frame structure that may be applied to frequency division duplex (FDD) scheme and a type 2 radio frame structure that may be applied to time division duplex (TDD) scheme. In the FDD mode, uplink transmission and downlink transmission are carried out separately in the respective frequency bands. Meanwhile, for the TDD mode, uplink and downlink transmission are carried out separately in the time domain but occupy the same frequency band. Channel responses in the TDD mode are in fact reciprocal. This implies that a downlink channel response is virtually the same as the corresponding uplink channel response in the frequency domain. Therefore, it may be regarded as an advantage for a wireless communication system operating in the TDD mode that a downlink channel response may be obtained from an uplink channel response. Since the whole frequency domain is so utilized in the TDD mode that uplink and downlink transmission are performed in time division fashion, downlink transmission by an eNB and uplink transmission by a UE cannot be performed simultaneously. In a TDD system where uplink and downlink transmission are managed in units of subframes, uplink and downlink transmission are carried out separately in the respective subframes.

FIG. 3($a$) illustrates a structure of a type 1 radio frame. A downlink radio frame includes 10 subframes, and each subframe includes two slots in the time domain. The time period needed to transmit one subframe is called a Transmission Time Interval (TTI). For example, length of each subframe may amount to 1 ms, and length of each slot may be 0.5 ms. Each slot includes a plurality of orthogonal frequency division multiplexing (OFDM) symbols in the time domain, and includes a plurality of resource blocks (RBs) in the frequency domain. The 3GPP LTE/LTE-A system uses the OFDMA method for downlink transmission; therefore, the OFDM symbol is intended to represent one symbol period. One OFDM symbol may be regarded to correspond to one SC-FDMA symbol or a symbol period. The resource block as a unit for allocating resources includes a plurality of consecutive subcarriers within one slot.

The number of OFDM symbols included within one slot may be different depending on the configuration of a cyclic prefix. The CP has an extended CP and a normal CP. For example, if an OFDM symbol includes normal CPs, the number of OFDM symbols included within one slot may be 7. If an OFDM symbol includes extended CPs, the number of OFDM symbols included within one slot becomes smaller than that for the normal CP case since the length of a single OFDM is increased. In the case of extended CP, for example, the number of OFDM symbols included within one slot may be 6. In case a channel condition is unstable as observed when the UE moves with a high speed, the extended CP may be used to further reduce inter-symbol interference.

One subframe includes 14 OFDM symbols because one slot includes 7 OFDM symbols when a normal CP is used. In this case, the first maximum 3 OFDM symbols of each subframe are allocated to the physical downlink control channel (PDCCH) and the remaining OFDM symbols are allocated to the physical downlink shared channel (PDSCH).

FIG. 3(b) illustrates a type 2 radio frame. The type 2 radio frame includes two half frames, and each half frame includes 5 subframes, and one subframe includes two slots. A special subframe of the 5 subframes includes a downlink pilot time slot (DwPTS), a guard period (GP), and an uplink pilot time slot (UpPTS). The DwPTS is used for a UE to perform the initial cell search, synchronization, and channel estimation. The UpPTS is used for the eNB to perform channel estimation and uplink transmission synchronization with the UE. The GP is a period intended for removing interference generated during uplink transmission due to multi-path delay of a downlink signal between uplink and downlink transmission.

The aforementioned structure of a radio frame is only an example, and the number of subframes included within one radio frame, the number of slots included within one subframe, and the number of symbols included within one slot may be varied in many ways.

Hereinafter, an RRC state of a UE and an RRC connection method are described in detail.

The RRC state indicates whether the RRC layer of the UE is logically connected to the RRC layer of an E-UTRAN. If the two layers are connected to each other, it is called an RRC connected state, and if the two layers are not connected to each other, it is called an RRC idle state. The UE in the RRC connected state has an RRC connection and thus the E-UTRAN may recognize the presence of the UE in a cell unit. Accordingly, the UE may be effectively controlled. Meanwhile, The UE in the RRC idle state cannot be recognized by the E-UTRAN, and is managed by a core network in a tracking area unit, that is, a greater area unit than a cell. That is, regarding the UE in the RRC idle state, only the presence or absence of the UE is recognized in a wide area unit. To get a typical mobile communication service such as voice or data, a transition to the RRC connected state is necessary.

When a user initially powers on a UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer located in an upper layer of the RRC layer serves to perform session management and mobility management.

To manage the mobility of the UE in the NAS layer, two states, that is, an EPS mobility management-REGISTERED (EMM-REGISTERED) state and an EMM-DEREGISTERED state, have been defined. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state.

When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. Meanwhile, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information is described.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) 'Radio Resource Control (RRC); Protocol specification (Release 8)', the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

FIG. 4 is a flowchart showing an operation of a UE in the RRC_IDLE state to which the present invention may be applied.

FIG. 4 shows a procedure of a UE being registered with a network through a cell selection process and performing cell reselection if needed after the UE is initially turned on.

Referring the FIG. 4, the UE selects a RAT for communicating with a PLMN from which the UE intends to be served (S410). Information about the PLMN and the RAT may be selected by a user of the UE. The user may use information stored in a Universal Subscriber Identity Module (USIM).

The UE selects a cell that belongs to cells whose measured BS and signal intensity or quality are greater than a specific value and that has the highest value (S420). This procedure may be called initial cell reselection. The cell selection procedure is described later. After the cell selection, the UE periodically receives system information from the BS. The predetermined value is a value defined in a communication system for ensuring a physical signal quality in data transmission/reception. Therefore, the predetermined value may be different depending on an applied RAT.

The UE performs a network registration procedure if needed (S430). The UE registers its own information (i.e., IMSI) in order to be served by the network (i.e. paging). The UE does not register whenever the UE selects a cell. When the UE's own information about the network is different from information about the network provided from the system information, the UE performs the network registration procedure.

The UE performs cell reselection based on a service environment or the UE's environment provided from the cell (S440). If the strength or quality value of a signal measured from a base station from which the UE is serviced is lower than a value measured from a base station of a neighbor cell, the UE, selects one of other cells providing a better signal characteristic than the base station to which the UE is linked. This process is referred to as cell reselection as distinguished from the initial cell selection of the No. 2 process. In this case, a temporal restricting condition is assigned to prevent cells from being frequently reselected as the signal characteristics vary. The cell reselection procedure is to be described below in detail.

FIG. 5 is a flowchart showing an RRC connection establishment procedure to which the present invention may be applied.

A UE sends, to a network, an RRC connection request message for requesting an RRC connection (S510). The network sends an RRC connection setup message in response to the RRC connection request (S520). After receiving the RRC connection setup message, the UE enters an RRC connection mode.

The UE sends, to the network, an RRC connection setup complete message used to confirm the successful completion of the RRC connection establishment (S530).

FIG. 6 is a flowchart showing an RRC connection reconfiguration procedure.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (S610). In response to the RRC connection reconfiguration, the UE sends to the network an RRC connection reconfiguration complete message used to confirm successful completion of the RRC connection reconfiguration (S620).

An RRC connection reestablishment procedure is now described below in greater detail.

FIG. 7 is a view illustrating an example RRC connection reestablishment procedure to which the present invention may apply.

Referring to FIG. 7, a UE stops using all of the configured radio bearers except SRB 0 (Signaling Radio Bearer #0) and initializes various sub-layers of AS (Access Stratum) (S710).

Further, the UE sets each sub-layer and physical layer as default configuration. During such procedure, the UE maintains the RRC connection state.

The UE performs a cell selection procedure for conducting an RRC connection reestablishment procedure (S720). Although the UE maintains the RRC connection state during the RRC connection reestablishment procedure, the cell selection procedure may be performed like the cell selection procedure performed by the UE in the RRC idle mode.

After performing the cell selection procedure, the UE identifies the system information on a corresponding cell to determine whether the corresponding cell is a proper cell (S730). In case the selected cell is determined to be a proper E-UTRAN cell, the UE sends an RRC connection reestablishment request message to the corresponding cell (S740).

Meanwhile, if the cell selected through the cell selection procedure for performing the RRC connection reestablishment procedure is determined to be a cell using another RAT other than the E-UTRAN, the UE stops the RRC connection reestablishment procedure and enters the RRC idle mode (S750).

The UE may be implemented to finish identifying whether the cell is proper within a limited time through the cell selection procedure and reception of the system information on the selected cell. To that end, the UE may run a timer as the UE initiates the RRC connection reestablishment procedure. The timer, when the UE is determined to have selected a proper cell, may stop. In case the timer expires, the UE considers it as failure of the RRC connection reestablishment procedure and may enter the RRC idle mode. This timer is hereinafter referred to as a radio link failure timer. According to the LTE spec. TS 36.331, a timer denoted T311 may be utilized as the radio link failure timer. The UE may obtain configuration values of the timer from the system information of the serving cell.

When receiving the RRC connection reestablishment request message from the UE and accepting the request, the cell transmits an RRC connection reestablishment message to the UE.

When receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

Accordingly, the SRB 1 between the UE and the cell is opened, and RRC control messages may be exchanged between the UE and the cell. The UE completes resuming SRB1 and sends to the cell an RRC connection reestablishment complete message indicating that the RRC connection reestablishment procedure has been complete (S760).

In contrast, if the cell receives the RRC connection reestablishment request message from the UE, but does not accept the request, the cell transmits an RRC connection reestablishment reject message to the UE.

If the RRC connection reestablishment procedure is successfully done, the cell and the UE perform an RRC connection reestablishment procedure. Accordingly, the UE recovers to the state before performing the RRC connection reestablishment procedure, thereby maximally guaranteeing service continuity.

Uplink Resource Allocation Procedure

In the case of the 3GPP LTE/LTE-A system, a method for data transmission and reception based on the scheduling of an eNB is used to maximize the utilization of radio resources. This means that if a UE has data to transmit, the UE requests the eNB to allocate uplink resources in the first place and is capable of transmitting data using only the uplink resources allocated by the eNB.

FIG. 8 illustrates an uplink resource allocation process of a UE in a wireless communication system to which the present invention may be applied.

For efficient use of radio resources in uplink transmission, an eNB needs to know which type of data and how much of the data will be transmitted to each UE in uplink. Therefore, the UE transmits to the eNB the information about uplink data that the UE attempts to transmit directly, and the eNB allocates uplink resources to the corresponding UE in accordance to the UE's transmission. In this case, the information about uplink data that the UE transmits to the eNB is the amount of uplink data stored in the UE's buffer, which is called buffer status report (BSR). When radio resources on the PUSCH are allocated during a current TTI and a reporting event is triggered, the UE transmits the BSR by using the MAC control element.

FIG. 8(a) illustrates an uplink resource allocation process for actual data if the uplink radio resources for buffer status reporting (BSR) have not been allocated to a UE. In other words, in the case of a UE whose state switches from the DRX mode to the active mode, since no data resources are allocated beforehand, the UE has to request resources for uplink data, starting with SR transmission through the PUCCH, and in this case, an uplink resource allocation procedure of five steps is employed.

FIG. 8(a) illustrates a case where PUSCH resources for transmitting BSR are not allocated to the UE, and the UE first transmits a scheduling request (SR) to the eNB in order to receive allocated PUSCH resources (S801).

The scheduling request is used for the UE to request the eNB to allocate the PUSCH resources for uplink transmission in case radio resources are not scheduled on the PUSCH during a current TTI although a reporting event has occurred. In other words, when a regular BSR has been triggered but uplink radio resources for transmitting the BSR to the eNB are not allocated to the UE, the UE transmits the SR through the PUCCH. Depending on whether the PUCCH resources for SR have been configured, the UE may transmit the SR through the PUCCH or starts a random access procedure. More specifically, the PUCCH resources through the SR may be transmitted are set up by an upper layer (for example, the RRC layer) in a UE-specific manner, and the SR configuration include SR periodicity and SR sub-frame offset information.

When the UE receives from the eNB an UL grant with respect to the PUSCH resources for BSR transmission (S803), the UE transmits a triggered BSR to the eNB through the PUSCH resources allocated by the UL grant (S805).

The eNB checks the amount of data to be actually transmitted by the UE through uplink transmission based on the BSR and transmits an UL grant for the PUSCH resources for the transmission of the actual data to the UE (S807). The UE that has received the UL grant for the transmission of the actual data transmits the actual uplink data to the eNB through the allocated PUSCH resources (S809).

FIG. 8(b) illustrates an uplink resource allocation process for actual data if uplink radio resources for buffer status reporting are allocated to a UE.

FIG. 8(b) illustrates a case where PUSCH resources for BSR transmission have already been allocated to the UE. The UE transmits the BSR through the allocated PUSCH resources and transmits a scheduling request to the eNB along with the BSR transmission S811. Next, by using the BSR, the eNB check the amount of data that the UE actually transmits through uplink transmission and transmits to the UE an UL grant with respect to the PUSCH resources for transmission of actual data S813. The UE, which has received an UL grant for transmission of actual data, transmits actual uplink data to the eNB through the allocated PUSCH resources S815.

FIG. 9 illustrates latency in a C-plane required in the 3GPP LTE-A system to which the present invention may be applied.

Referring to FIG. 9, the 3GPP LTE-A standard requires that transition time from the IDLE mode (the state where an IP address is assigned) to the connected mode is less than 50 ms. In this case, the transition time includes setting time (which excludes S1 transmission delay time) for the user plane (U-Plane). Also, the transition time from the dormant state to the active state within the connected mode is required to be less than 10 ms.

Transition from the dormant state to the active state may be generated in the following four scenarios.

Uplink initiated transition in the case of a synchronized UE

Uplink initiated transition in the case of an unsynchronized UE

Downlink initiated transition in the case of a synchronized UE

Downlink initiated transition in the case of an unsynchronized UE

Random Access Channel (RACH) Procedure

FIGS. 10a and 10b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) may be mapped to a physical channel, random access channel (RACH). The RACH is mapped to a physical channel, physical random access channel (PRACH).

If the MAC layer of a UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 10a illustrates one example of a contention-based random access procedure, and FIG. 10b illustrates one example of a non-contention based random access procedure.

First, the contention-based random access procedure is described with reference to FIG. 10a.

A UE receives information about random access from an eNB through system information and stores the received information. Afterwards, in case random access is needed, the UE transmits a random access preamble (which is also called a message 1) to the eNB (S1001).

If the eNB receives a random access preamble from the UE, the eNB transmits a random access response message (which is also called a message 2) to the UE (S1002). More specifically, downlink scheduling information about the random access response message, being CRC-masked with a random access-ratio network temporary identifier (RA-RNTI), may be transmitted on an L1 or L2 control channel (PDCCH). The UE, which has received a downlink scheduling signal masked with an RA-RNTI, may receive the random access response message from a physical downlink shared channel (PDSCH) and decode the received message. Afterwards, the UE checks the random access response message as to whether random access response information for the UE exists.

The UE may determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information (S1003). In this case, uplink transmission may be described as scheduled transmission.

After receiving the uplink transmission from the UE, the eNB transmits a message for contention resolution (which is also called a message 4) to the UE through a downlink shared channel (DL-SCH) (S1004).

Next, a non-contention based random access procedure will be described with reference to FIG. 10b.

Before the UE transmits a random access preamble, the eNB allocates a non-contention random access preamble to the UE S1011.

The non-contention random access preamble may be allocated through a handover command or dedicated signaling such as signaling through the PDCCH. In case non-contention random access preamble is allocated to the UE, the UE transmits the allocated non-contention random access preamble to the eNB (S1012).

Afterwards, similarly to the step S1002 of the contention-based random access procedure, the UE may transmit a random access response (which is also called a message 2) to the UE (S1013).

Although the HARQ is not applied for a random access response during the random access procedure described above, the HARQ may be applied for uplink transmission with respect to a random access response or a message for contention resolution. Therefore, the UE doesn't have to transmit an ACK or NACK signal for the case of the random access response.

An UL data transmission method in LTE(-A) or 802.16 is described in brief.

A cellular system, such as an LTE(-A) system or 802.16m, uses an eNB scheduling-based resource allocation method.

In a system using the eNB scheduling-based resource allocation method, a UE having data (i.e., UL data) to be transmitted requests resources for transmitting the corresponding data from an eNB prior to the transmission of the data.

The scheduling request of the UE may be performed by transmitting a scheduling request (SR) through a PUCCH or transmitting a buffer status report (BSR) through a PUSCH.

Furthermore, if resources for transmitting the SR or BSR are not allocated to the UE, the UE may request UL resources from the eNB through an RACH procedure.

The eNB that has received the scheduling request from the UE as described above allocates the UL resources to be used by the UE to the UE through a downlink control channel (i.e., an UL grant message, DCI in the case of LTE(-A)).

In this case, the UL grant transmitted to the UE may be notified by explicitly signaling that the resources allocated to the UE correspond to the resources of which subframe, but an agreed time between the UE and the eNB may be defined as the allocation of resources for a subframe after a specific time (e.g., 4 ms in the case of LTE).

As described above, what the eNB allocates the resources to the UE after X ms (e.g., 4 ms in the case of LTE(-A)) means that the resources are allocated to the UE by taking into consideration the entire time taken for the UE to receive and decode an UL grant and to prepare and encode the data to be transmitted.

FIG. 11 is a diagram showing an example of a method of allocating UL resources without a scheduling request (SR) from a UE.

In an RRC connection establishment process of a UE switching from an idle mode to a connected mode, an eNB may recognize that the UE will transmit a response message (e.g., RRC connection setup complete) for an RRC message (e.g., RRC connection setup) transmitted by the eNB.

In this case, the eNB may allocate UL resources for the response message without a scheduling request from the UE after a specific time.

In this case, the specific time is time corresponding to a processing delay requirement for the RRC message received from the UE. In the LTE(-A) system, the processing delay requirement is 15 ms in the case of the RRC connection setup complete message.

As shown in FIG. 11, it may be seen that latency of about 21 ms is generated from a point of time at which the UE receives the RRC message from the eNB to a point of time at which the UE transmits the response message for the RRC message.

The latency of 21 ms in the UE includes the processing delay requirement for the RRC message received from the eNB and decoding/data encoding time for an UL grant received from the eNB.

FIG. 12 is a diagram showing an example of a method of allocating UL resources in response to a scheduling request (SR) from a UE.

As shown in FIG. 12, an eNB may allocate resources for an RRC response message in response to an SR from a UE.

In this case, latency of 9 ms is generated from a point of time at which the eNB allocates an UL grant to the UE from a point of time at which the UE transmitted the SR signal to the eNB to a point of time at which the UE transmits an RRC response message to the eNB.

As shown in FIG. 12, the sum of the time that is taken for the UE to receive the RRC message from the eNB, to process the RRC message received from the eNB until it transmits the response message for the RRC message, and to generate the RRC response message (e.g., processing delay for the received RRC message, 6 ms) and the time that is taken for the UE to transmit the RRC response message from a point of time at which the SR signal was transmitted (e.g., 9 ms) is consumed.

In this case, the SR resources allocated to the UE may be allocated to a PUCCH at a specific cycle, and may be allocated in a cycle of a minimum of 1 ms~a maximum of 80 ms.

Assuming that an SR of a 1 ms cycle has been allocated to the UE, an average time taken to wait for PUCCH resources for SR transmission is 0.5 ms, and delay time until data transmission through the SR is 9.5 ms.

Accordingly, if the processing time of the UE for the received RRC message (e.g., processing delay for the received RRC message) is less than 11.5 ms, to occupy UL resources and transmit UL data through the scheduling request of a UE may be advantageous in terms of a reduction of C-plane latency compared to the method of FIG. 11.

FIG. 13 is a diagram showing an example of a method of allocating UL resources through the scheduling request (SR) and buffer status report (BSR) of a UE.

As shown in FIG. 13, a UE may transmit an RRC message to an eNB after about 17 ms from a point of time at which the UE transmitted an SR signal.

Accordingly, if the processing time of the UE for the received RRC message is less than 3.5 ms, to occupy UL resources and transmit UL data through the scheduling request and buffer status report of the UE may be advantageous compared to the method of FIG. 12 in terms of a reduction of C-plane latency.

Recently, there emerges a need for various real-time application services, such as health care, traffic safety, disaster safety, and remote medical control.

In particular, it is expected that a low latency service which prevents a secondary accident or enables an urgent situation to be rapidly handled by rapidly notifying an eNB or a nearby UE/user of information about an accident or state which may occur due to a specific event on an unexpected time from various end users, such as the human or machines (e.g., a vehicle and a sensor) will be provided as a major service of IMT 2020.

Accordingly, in a wireless communication system, in order to support such a low delay service, latency of the transmission/reception of data must be essentially reduced.

This also corresponds to a UE in the idle mode in addition to a UE in the connected mode.

Accordingly, in the case of a UE in the idle mode, the time taken for an RRC connection setup (i.e., the time taken to switch to the connected mode) needs to be reduced.

It is also expected that an IMT-2020 communication (5G communication) UE will be spread from a smartphone to a wearable computer, a vehicle, CCTV, a robot, a drone, etc.

It is expected that communication UEs of various forms will have different performance (e.g., processing delay) and a great performance difference depending on that which processor is mounted on the UE.

Latency for the transmission of an RRC connection setup complete message of a UE according to a conventional UL resource grant method is described below with reference to FIG. 14.

FIG. 14 is a diagram illustrating a conventional UL resource grant method.

First, when a service request from a UE is generated due to a user or a specific event, the non access stratum (NAS) of the UE transmits a service request message to the RRC layer of the UE (S1401).

Thereafter, the RRC layer of the UE transmits an RRC connection request message in order to establish an RRC connection with an eNB (S1402).

In this case, in order to transmit the RRC connection request message to the eNB, the UE performs an RACH procedure along with the eNB (S1403).

The RACH procedure indicates a signal transmission/reception process in the RLC/MAC/PHY layers between the UE and the eNB. For a detailed description of the RACH procedure, reference is made to FIG. 10.

Thereafter, when the UE receives an RRC connection setup message from the eNB through the RACH procedure (S1404), the UE transmits an RRC connection setup complete message through the processing of the received RRC message in the RRC layer (S1405).

In this case, latency corresponding the time taken for the UE to process the received RRC message may be generated.

In order to transmit the RRC connection setup complete message to the eNB, the UE performs the aforementioned UL resource grant procedure (without an SR or through an SR or through an SR and a BSR) (S1406).

That is, the UE transmits the RRC connection setup complete message to the eNB through an UL resource region allocated through the UL resource grant procedure.

Likewise, latency corresponding to the time taken to perform the UL resource grant procedure may be generated.

As a result, referring to FIGS. 11 to 14, in an UL resource grant method according to a conventional method, latency corresponding the following time is generated.

1. An UL resource grant method not having a scheduling request from a UE:

latency of 21 ms is generated (including the processing time of a received RRC message)

2. An UL resource grant method using a scheduling request from a UE:

the processing time of a received RRC message+latency of 9.5 ms (SR transmission) are generated 3. An UL resource grant method through the scheduling request and buffer status report of a UE:

the processing time of a received message time+latency of 17.5 ms (SR and BSR transmission) are generated An UL resource grant method for rapidly setting up an RRC connection, proposed by this specification, is described in detail below with reference to a related figure.

FIG. 15 is a diagram showing an example of an UL resource allocating method proposed by this specification.

As shown in FIG. 15, a UE receives system information from an eNB (S1501).

The system information may be classified as a master information block (MIB) or a system information block (SIB). The MIB is transmitted through a PBCH, and the SIB is transmitted through a PDSCH.

For a detailed description of the system information, reference is made to the aforementioned contents.

Thereafter, the UE transmits a service request from an NAS (within the UE) to an RRC (or AS) layer (S1502).

Thereafter, the UE transmits an RRC connection request message to the eNB in order to request UL resource grant through RRC connection establishment with the eNB (S1503).

the RRC connection request message may include an S-TMIS, a cause field, an UL resource request IE and so on.

The cause field refers to information indicative of an object of transmitting the RRC connection request message.

The cause field may include information indicative of an UL resource grant request having an object of a low delay service (e.g., mobile originating urgent or mobile terminating urgent).

The UL resource request IE may include at least one of a UE capability type field indicative of the capability of a UE that trying to access an eNB, an UL grant offset_UE field indicative of a point of time at which the UE requests UL resources, and an UL grant size field indicative of the size of a message or data to be transmitted through the UL resources.

Furthermore, the UL resource request IE may further include a device type field indicative of the type of UE.

Thereafter, the UE receives an RRC connection setup message corresponding to a response to the RRC connection request message from the eNB (S1504).

The RRC connection setup message may include an UL resource response IE indicative of result information or response information for the UL resource grant request of the UE.

Thereafter, the UE receives the UL resources allocated by the eNB at a specific point of time or a specific interval (S1505).

The UL resource grant may be performed through a PDCCH.

Furthermore, the eNB may perform the UL resource grant for the UE based on the UL resource request IE received from the UE, and a detailed description thereof is given in more detail with reference to FIGS. 16 to 19.

The specific point of time or specific interval may mean a point of time or interval corresponding to a specific point of time (e.g., an UL grant offset) from a point of time at which the eNB transmitted the RRC connection setup message to the UE.

Thereafter, the UE transmits an RRC connection setup complete message through the UL resources allocated by the eNB (S1506).

Each of the steps of FIG. 15 is described in more detail below with reference to FIGS. 16 to 19.

Method for UE to Request UL Resources

A method for a UE to request UL resources, which is proposed by this specification, may be divided into (1) an UL resource request method according to the capability type of a UE and (2) an UL resource request method according to the UL grant offset of a UE.

The method for a UE to request UL resources (step S1503 in FIG. 15) is described in more detail below with reference to FIGS. 16 and 17.

FIG. 16 is a diagram showing an example of a method of allocating UL resources in response to an UL resource request according to the capability type of a UE, which is proposed by this specification.

Steps S1601, S1602 and S1604 to S1606 are the same as steps S1501, S1502 and S1504 to S1506 of FIG. 15, and thus a detailed description thereof is omitted and a difference between them is chiefly described.

FIG. 16 shows a method of previously defining or determining an UL grant offset_UE indicative of a point of time at which a UE requests an UL resource grant by taking into consideration an RRC message processing time according to the capability type of the UE.

The capability type of the UE may be determined depending on performance of hardware mounted on each UE.

For example, in the case of a robot for saving a life, a drone, a vehicle having a function, such as autonomous driving, etc., the time taken to process an RRC message transmitted by an eNB may be very short because the amount of power consumption is not greatly influenced and high-performance hardware is mounted.

In contrast, in the case of a sensor having an agricultural automation object, a common smartphone, etc., the time taken to process an RRC message received from an eNB is relatively long because low-performance hardware is mounted compared to the aforementioned UEs due to a limit to the size of the UE and the amount of power consumption.

Accordingly, UEs are previously classified depending on the RRC message processing times of the UEs, and UEs belonging to the same classification group may be defined to have the same capability type.

Referring to FIG. 16, after Step S1602, the UE transmits an UL resource request IE including the UE capability type to the eNB through an RRC connection request message (S1603).

Thereafter, the eNB allocates an UL grant to the UE through a PDCCH using the received UE capability type and previously defined mapping information (S1605).

The previously defined mapping information refers to information indicative of a relation between the capability type of the UE, processing delay information and UL grant offset_UE information.

Furthermore, the relation between the processing delay information and the UL grant offset_UE information may be defined as in Equation 1 below.

$$\text{UL grant offset}_{UE_{capability\ type}} \geq \text{MAX[Processing delay-}capability\ type]} \quad \text{[Equation 1]}$$

Table 1 shows an example of processing delay information and UL grant offset_UE information according to the capability type of a UE.

TABLE 1

| UE capability type | Processing delay (ms) | UL grant offset_UE (ms) |
|---|---|---|
| 00 | 0~4 | 5 |
| 01 | 5~9 | 10 |
| 10 | 10~14 | 15 |
| 11 | 15~19 | 20 |

That is, the eNB can be aware of processing delay from a point of time at which the UE received the RRC connection setup message to a point of time at which an RRC connection setup complete message will be generated and a point of time at which the UE requires an UL resource grant (UL grant offset_UE) through the UE capability type received from the UE.

Thereafter, the UE receives an UL grant from the eNB through a PDCCH in the UL grant offset_UE time or interval determined based on the capability type of the UE (S1605).

The UL grant offset_UE is information about a point of time at which the UE requires the UL resource grant, and may indicate an interval between a point of time at which the eNB transmits the RRC connection setup message and a point of time at which the PDCCH is transmitted.

Thereafter, the UE transmits an RRC connection setup complete message to the eNB through the allocated UL resources (S1606).

FIG. 17 is a diagram showing an example of a method of allocating UL resources in response to an UL resource request according to an UL grant offset, which is proposed by this specification.

Steps S1701, S1702 and S1704 to S1706 are the same as steps S1501, S1502 and S1504 to S1506 of FIG. 15 and a detailed description thereof is omitted, and a difference between FIGS. 17 and 15 is chiefly described below.

FIG. 17 shows a method of including an UL grant offset_UE in an UL resource request IE and explicitly transmitting the UL resource request IE.

In this case, the eNB can be aware of a point of time at which the UE requests an UL resource grant through a received UL grant offset_UE.

After step S1702, the UE transmits an UL resource request IE including the UL grant offset_UE indicative of a point of time at which the UL resource grant is requested to the eNB (S1703).

Thereafter, the eNB transmits or allocates an UL grant to the UE through a PDCCH after a point of time at which the RRC connection setup message was transmitted+the UL grant offset_UE time (S1705).

Thereafter, the UE transmits an RRC connection setup complete message to the eNB through the UL resources allocated through the PDCCH (S1706).

Method for eNB to Respond to UL Resource Request

A method for an eNB to respond to the UL resource request of a UE (step S1504 in FIG. 15) is described in more detail below with reference to FIGS. 18 and 19.

That is, the eNB may process an UL resource response IE through an implicit or explicit method by taking into consideration an UL resource request IE, cause information, etc. received from the UE.

FIG. 18 is a diagram showing an implicit response method of an eNB, and FIG. 19 is a diagram showing an explicit response method of an eNB.

First, the implicit response method of the eNB is described below with reference to FIG. 18.

FIG. 18 is a flowchart illustrating an example of an UL resource grant method according to the response method of an eNB, which is proposed by this specification.

Steps S1801 to S1803, S1805 and S1806 are the same as steps S1501 to S1503, S1505 and S1506 of FIG. 15 and a detailed description thereof is omitted, and a difference between FIGS. 18 and 15 is chiefly described below.

After step S1802, the UE transmits an UL resource request IE to the eNB through an RRC connection request message (S1803).

Thereafter, the eNB does not separately include an UL resource response IE in an RRC connection setup message and responds to the UL resource request of the UE (S1804).

In this case, when the UE receives an RRC connection setup message, it recognizes that UL resources are allocated by the eNB at a point of time at which the UE requested the UL resource grant.

Accordingly, the UE monitors an UL grant (via a PDCCH) from the point of time (=UL grant offset_UE) requested by the UE.

The UE receives the UL resources (or UL grant) allocated by the eNB (S1805), and transmits an RRC connection setup complete message to the eNB through the allocated UL resources (S1806).

The explicit response method of an eNB is described below with reference to FIG. 19.

FIG. 19 is a flowchart illustrating another example of an UL resource grant method according to the response method of an eNB, which is proposed by this specification.

Steps S1901 to S1903, S1905 and S1906 are the same as steps S1501 to S1503, S1505 and S1506 of FIG. 15 and a detailed description thereof is omitted, and a difference between FIGS. 19 and 15 is chiefly described.

After step S1902, the UE transmits an UL resource request IE to the eNB through an RRC connection request message (S1903).

The UL resource request IE includes information related to the UL resource grant request of the UE.

Thereafter, the eNB transmits an UL resource response IE, including a result of the UL resource request IE or information related to an UL resource grant time, to the UE through an RRC connection setup message (S1904).

The UL resource response IE may include at least one of a result field indicative of a result of the UL resource request of the UE, an UL grant offset_BS field indicative of a point of time at which UL resources are capable of being allocated, and an UL grant interval_BS field indicative of the interval during which the UL resources are capable of being allocated.

In this case, the UL resource response IE may include any one of the result field, the UL grant offset_BS field and the UL grant interval_BS field, but may include one or more of them, if necessary.

Table 2 shows an example of the result field indicative of a result of the UL resource request of the UE.

TABLE 2

| RESULT | DESCRIPTION |
|---|---|
| 0 | Reject |
| 1 | Accept |

In Table 2, when a value of the result field is "0", it indicates rejection for the UL resource grant request of the UE. When a value of the result field is "1", it indicates that the UL resources are allocated at the point of time when the UE requested the UL resource grant.

That is, when the UE receives the UL resource response IE, including the result field defined as in Table 2, from the eNB, it can be aware of a result of the UL resource grant that has been requested from the eNB.

Furthermore, when a value of the result field is "Accept", the UE monitors a PDCCH through which the UL grant is transmitted at the point of time (=UL grant offset_UE) at which the UL resource grant is requested.

Table 3 shows an example of the UL grant offset_BS field indicative of a point of time at which the UL resources are capable of being allocated.

TABLE 3

| UL grant offset_BS | Description |
|---|---|
| 00 | Identical with UL grant offset_UE |
| 01 | UL grant offset_UE + 2 ms |
| 10 | UL grant offset_UE + 4 ms |
| 11 | Reject |

In Table 3, when a value of the UL grant offset_BS field is "00""01" or '10", it indicates acceptance the UL resource grant request of the UE. When a value of the UL grant offset_BS field value is "11", it indicates rejection for the UL resource grant request of the UE.

Specifically, when a value of the UL grant offset_BS field is "00", it indicates that the UL resources are allocated at the point of time requested by the UE. When a value of the UL grant offset_BS field is "01", it indicates that the UL resources are allocated at a point of time after 2 ms (2 subframes) from the point of time requested by the UE. When a value of the UL grant offset_BS field is "10", it indicates that the UL resources are allocated at a point of time after 4 ms (4 subframes) from the point of time requested by the UE.

Likewise, when the UE receives an UL resource response IE, including the UL grant offset_BS field defined as in Table 3, from the eNB, it can be aware of a result of the UL resource grant that has been requested from the eNB.

That is, if a value of the UL grant offset_BS field value excludes "Reject", the UE monitors a PDCCH through which the UL grant is transmitted at a point of time (=UL grant offset_UE+α, α=0, 2, 4 ms depending on a value of the UL grant offset_BS) indicated in a value of the UL grant offset_BS field.

Table 4 shows an example of the UL grant interval_BS field indicative of the interval during which the UL resources are capable of being allocated.

TABLE 4

| UL grant interval_BS | Description |
| --- | --- |
| 00 | Identical with the UL grant offset_UE |
| 01 | From UL grant offset_UE to UL grant offset_UE + 2 ms |
| 10 | From UL grant offset_UE to UL grant offset_UE + 4 ms |
| 11 | Reject |

In Table 4, when a value of the UL grant interval_BS field is "00", '01" or '10", it indicates acceptance for the UL resource grant request of the UE. When a value of the UL grant interval_BS field is "11", it indicates rejection for the UL resource grant request of the UE.

Specifically, when a value of the UL grant interval_BS field is "00", it indicates that the UL resources are allocated at the point of time requested by the UE. When a value of the UL grant interval_BS field is "01", it indicates that the UL resources are allocated between the point of time requested by the UE and the point of time requested by the UE+2 ms (2 subframes) (or an interval). When a value of the UL grant interval_BS field is "10", it indicates that the UL resources are allocated between the point of time requested by the UE and the point of time requested by the UE+4 ms (4 subframes).

When the UE receives an UL resource response IE, including the UL grant interval_BS field defined as in Table 4, from the eNB, it can be aware of a result of the UL resource grant that has been requested from the eNB.

That is, if a value of the UL grant interval_BS field excludes "Reject", the UE monitors a PDCCH through which the UL grant is transmitted in the interval indicated in a value of the UL grant interval_BS (=UL grant offset_UE~UL grant offset_UE+α, α=0, 2, 4 ms depending on a value of the UL grant interval_BS).

If the UE receives an UL resource response IE, including a value indicative of rejection for the UL resource grant request, from the eNB, it requests an UL resource grant using a conventional method, that is, an SR and/or a BSR (i.e., a fall-back mode).

FIG. 20 is a diagram showing an UL resource grant method proposed by this specification and a reduction of corresponding transmission latency.

It may be seen from FIG. 20 that if one of the UL resource grant methods of FIGS. 15 to 19 is used, transmission latency of UL data (or an RRC message) can be significantly reduced because the time taken for a UE to transmit a generated RRC connection setup complete message to an eNB after generating the RRC connection setup complete message is reduced to a minimum of 4 ms.

That is, latency attributable to the transmission of the RRC connection setup complete message from the UE to the eNB can be reduced because the UL grant is allocated to the UE through a PDCCH after a specific point of time (i.e., an UL grant offset) without transmitting an SR and/or a BSR after the RRC connection setup message is transmitted from the eNB to the UE.

A method of using the UL resource grant method, described with reference to FIGS. 15 to 19, in other procedures (e.g., an RRC connection reestablishment procedure) other than an RRC connection establishment procedure is described below.

That is, the UL resource grant request and the response method of an eNB according to the UL resource grant request which have been described with reference to FIGS. 15 to 19 may also be applied to a resource allocation method for the transmission of a response message (e.g., RRC connection reconfiguration complete, RRC connection reestablishment complete or security mode command complete) for other RRC messages (e.g., RRC connection reconfiguration, RRC connection reestablishment and a security mode command) related to an RRC connection.

FIG. 21 is a diagram illustrating another example of an UL resource grant method proposed by this specification.

That is, FIG. 21 shows an example in which the UL resource grant method of FIGS. 15 to 19 has been applied to an RRC connection reestablishment procedure.

An RRC connection reestablishment procedure may be generated in a situation, such as the detection of a link failure attributable to deteriorated radio quality, a handover failure of a UE, or a failure of an integrity and radio connection environment configuration.

Referring to FIG. 21, a UE transmits an RRC connection reestablishment request message to a target eNB after performing a cell selection procedure (S2101).

The RRC Connection Reestablishment Request message includes a C-RNTI, a PhysCellID, a cause field and so on.

Thereafter, the target eNB requests information related to the UE from a source eNB to which the UE was connected right before using a received UE ID (e.g., a C-RNTI or a physical cell ID) (S2102).

That is, the target eNB transmits a UE context request to the source eNB.

Thereafter, the source eNB transmits a UE context response, including a UE capability IE related to the capability information of the UE, to the target eNB (S2103).

The UE capability IE includes at least one of a UE capability type indicative of the capability of the UE owned by the source eNB, an UL grant offset_UE field indicative of a point of time at which the UE requests UL resources, and an urgent indicator indicating whether a low delay service is provided or not between the source eNB and the UE.

Thereafter, the target eNB notifies the UE of an UL resource grant method by transmitting an RRC connection reestablishment message, including an UL resource IE related to an UL resource grant, to the UE using the UE capability IE received from the source eNB (S2104).

The UL resource IE may be the same as the aforementioned UL resource response IE or may be defined as the same form, such as that of Table 5 and Table 6.

Table 5 shows an example of the UL grant offset_BS field, and Table 6 shows an example of the UL grant interval_BS field.

TABLE 5

| UL grant offset_BS | Description |
| --- | --- |
| 00 | Identical with UL grant offset_UE |
| 01 | UL grant offset_UE + 2 ms |
| 10 | UL grant offset_UE + 4 ms |
| 11 | UL grant offset_UE + 6 ms |

In this case, when the UE receives the UL resource IE, including the UL grant offset_BS field defined as in Table 5, from the eNB, it monitors a PDCCH through which the UL grant is transmitted at a point of time (=UL grant offset_UE+α, α=0, 2, 4, 6 ms according to a value of the UL grant offset_BS) indicated in the UL grant offset_BS field.

TABLE 6

| UL grant interval_BS | Description |
|---|---|
| 00 | Identical with UL grant offset_UE |
| 01 | From UL grant offset_UE to UL grant offset_UE + 2 ms |
| 10 | From UL grant offset_UE to UL grant offset_UE + 4 ms |
| 11 | From UL grant offset_UE to UL grant offset_UE + 6 ms |

In this case, when the UE receives the UL resource IE, including the UL grant interval_BS field defined as in Table 6, from the eNB, it monitors a PDCCH through which the UL grant is transmitted in an interval (=UL grant offset_UE~UL grant offset_UE+$\alpha$, $\alpha$=0, 2, 4, 6 ms according to a value of the UL grant interval_BS) indicated in the UL grant interval_BS field.

Likewise, if the UL resource IE indicates "Reject" for the UL resource grant although the UL resource IE is not included or the UL resource IE is included in the RRC Connection Reestablishment message, the UE requests an UL resource grant using a conventional method (e.g., a scheduling request) (i.e., a fall-back mode).

Thereafter, the target eNB allocates the UL grant to the UE through a PDCCH at a specific point of time or in a specific interval (e.g., a point of time from a point of time at which the RRC connection reestablishment message was transmitted by an UL grant offset) (S2105).

If the UE does not receive the UL resources allocated by the eNB at the specific point of time or in the specific interval (including a reception failure), it requests the UL resource grant using a conventional method (e.g., a scheduling request).

Thereafter, the UE transmits an RRC connection reestablishment complete message to the target eNB through the allocated UL resources (S2106).

The UL resource grant method proposed by this specification described above and the conventional UL resource grant method may be compared and summarized as in Table 7 below.

TABLE 7

| | UL resource grant method | Transmission latency of RRC connection setup complete message |
|---|---|---|
| Conventional method | Resource allocation without scheduling request of UE | 21 ms (numerical value including processing delay) |
| | Resource allocation through scheduling request of UE | Processing delay + 9.5 ms |
| | Resource allocation through scheduling request and buffer status report of UE | Processing delay + 17.5 ms |
| | Proposed method | Processing delay + 4 ms |

As shown in Table 7, if the UL resource grant method proposed by this specification is used, it can be seen that transmission latency of UL data is significantly reduced.

In this case, it is assumed that TTI=1 ms and eNB scheduling delay =0.

FIG. 22 is an internal block diagram showing a wireless apparatus in which the methods proposed by this specification may be implemented.

In this case, the wireless apparatus may be an eNB and a UE, and the eNB includes both a macro eNB and a small eNB.

As shown in FIG. 22, the eNB 2210 and the UE 2220 include communication units (or transmission/reception units or RF units 2213 and 2223), processors 2211 and 2221 and memory 2212 and 2222, respectively.

The eNB and the UE may further include input units and output units.

The communication unit 2213, 2223, the processor 2211, 2221, the input unit, the output unit, and the memory 2212, 2222 are functionally connected in order to perform the method proposed by this specification.

When the communication unit (or transmission/reception unit or RF unit 2213, 2223) receives information generated by the physical layer (PHY) protocol, it moves the received information to a radio-frequency (RF) spectrum, performs filtering and amplification on the information, and transmits the results to an antenna. Furthermore, the communication unit functions to move a radio frequency (RF) signal, received from the antenna, to a band capable of being processed in the PHY protocol and to filter the signal.

Furthermore, the communication unit may have a switch function for switching such a transmission and reception function.

The processor 2211, 2221 implements the functions, processes and/or methods proposed by this specification. The layers of a radio interface protocol may be implemented by the processor.

The processor may also be expressed as a control unit, a controller, a control unit or a computer.

The memory 2212, 2222 is connected to the processor and stores a protocol or parameter for performing the UL resource grant method.

The processor 2211, 2221 may include application-specific integrated circuits (ASICs), other chipsets, logic circuits and/or data processors. The memory may include read-only memory (ROM), random access memory (RAM), flash memory, a memory card, a storage medium and/or other storage devices. The communication unit may include a baseband circuit for processing a radio signal. When an embodiment is implemented in software, the aforementioned scheme may be implemented as a module (or process or function) for performing the aforementioned function.

The module is stored in the memory and may be executed by the processor. The memory may be located inside or outside the processor and coupled to the processor by various well-known means.

An output unit (or display unit) is controlled by the processor, and outputs information output by the processor along with a key input signal generated by a key input unit and various information signals from the processor.

Furthermore, the drawings have been divided and described for convenience of description, but a new embodiment may be designed so that it is implemented by merging the embodiments described with reference to the drawings. Furthermore, the scope of the present invention also includes designing a computer-readable recording medium in which a program for executing the aforementioned embodiments has been written according to the needs of those skilled in the art.

The UL resource grant method according to this specification is not limited and applied to the configurations and methods of the aforemtioned embodiments, but some or all of the embodiments may be selectively combined and configured so that the embodiments are modified in various ways.

The UL resource grant method of this specification may be implemented in a processor-readable recording medium included in a network device, in the form of code readable by a processor. The processor-readable recording medium includes all types of recording devices in which data readable by a processor is stored. The recording medium may include ROM, RAM, CD-ROM, magnetic tapes, floppy disks, and optical data storages, for example. Furthermore, the processor-readable recording medium may be implemented in the form of carrier waves, such as transmission through the Internet.

Furthermore, the processor-readable recording medium may be distributed to computer systems connected over a network, and the processor-readable code may be stored and executed in a distributed manner.

INDUSTRIAL APPLICABILITY

Meanwhile, the scheme for the transmission of UL data in a wireless communication system according to the embodiments of the present invention has been illustrated as being applied to 3GPP LTE/LTE-A systems, but may be applied to various wireless communication systems in addition to the 3GPP LTE/LTE-A systems.

The invention claimed is:

1. A method for allocating uplink (UL) resources in a wireless communication system supporting a specific service, the method being performed by a user equipment (UE) and comprising:
   transmitting a radio resource control (RRC) connection request message comprising a UL resource request information element (IE) for requesting a UL resource grant to an evolved NodeB (eNB), the UL resource request IE comprising a UE capability type field associated with a point of time at which UL resources requested by the UE are allocated;
   receiving an RRC connection setup message comprising a response to the UL resource request IE from the eNB, the response comprising UL grant offset information indicative of the point of time at which the UL resources requested by the UE are allocated;
   receiving the UL resources allocated by the eNB based on the received UL grant offset information; and
   transmitting an RRC connection setup complete message to the eNB through the allocated UL resources,
   wherein the UL grant offset information is determined by taking into consideration processing delay indicated by a value of the UE capability type field.

2. The method of claim 1, wherein the UL resource request IE further comprises at least one of a cause field indicative of the UL resource request for the specific service and a device type field indicative of a type of the UE.

3. The method of claim 1, wherein the value of the UE capability type field indicates time from a point of time at which the RRC connection setup message is received to a point of time at which the RRC connection setup complete message is generated.

4. The method of claim 3, wherein the UL grant offset information has a value identical with or greater than a maximum value of the UE capability type field.

5. The method of claim 1, wherein the UL resources are allocated at a point of time after the UL grant offset information from a point of time at which the RRC connection setup message is transmitted.

6. The method of claim 1, wherein:
   the UL resource request IE further comprises a UL grant offset field indicative of a point of time at which the UE requests the UL resources, and
   the UL grant offset information comprises an offset value identical with or greater than a value of the UL grant offset field indicative of the point of time at which the UE requests the UL resources.

7. The method of claim 1, wherein the receiving the allocated UL resources comprises monitoring a physical downlink control channel (PDCCH) through which the UL resources are transmitted.

8. The method of claim 1, wherein the UE is in an idle state.

9. A method of allocating uplink (UL) resources in a wireless communication system supporting a specific service, the method being performed by a first evolved NodeB (eNB) and comprising:
   receiving an RRC connection reestablishment request message comprising user equipment (UE) identity (ID) information from a UE;
   receiving a UE capability information element (IE) comprising a UE capability type field indicative of a capability type of the UE corresponding to the received UE ID information from a second eNB;
   determining a UL grant offset value indicative of a point of time at which UL resources are allocated to the UE by taking into consideration processing delay indicated by a value of the received UE capability type field;
   transmitting an RRC connection reestablishment complete message comprising the determined UL grant offset value to the UE;
   allocating the UL resources to the UE in the determined UL grant offset value; and
   receiving an RRC connection reestablishment complete message from the UE through the allocated UL resources.

10. The method of claim 9, further comprising transmitting a UE context request message for requesting the UE capability IE related to the received UE ID information to the second eNB, wherein the UE capability IE is included in a UE context response message and received.

11. The method of claim 9, wherein the UE capability IE comprises at least one of:
   a UL grant offset field indicative of the point of time at which the UE requests the UL resources, and
   an urgent indicator field indicating whether the specific service is provided between the second eNB and the UE.

12. The method of claim 11, wherein the UL grant offset value comprises an offset value identical with or greater than a value of the UL grant offset field indicative of the point of time at which the UE requests the UL resources.

13. The method of claim 9, wherein:
   the first eNB comprises a target eNB, and
   the second eNB comprises a source eNB.

14. A user equipment (UE) for allocating uplink (UL) resources in a wireless communication system supporting a specific service, the UE comprising:
   a transceiver configured to transmit and receive radio signals; and
   a processor functionally coupled to the transceiver,
   wherein the processor is configured to:
      control the transceiver to transmit a radio resource control (RRC) connection request message comprising a UL resource request information element (IE) for requesting a UL resource grant to an evolved NodeB (eNB), the UL resource request IE comprising a UE capability type field associated with a point of time at which UL resources requested by the UE are allocated,
      control the transceiver to receive an RRC connection setup message comprising a response to the UL resource request IE from the eNB, the response comprising UL grant offset information indicative of the point of time at which the UL resources requested by the UE are allocated, the UL resources allocated by the eNB are received based on the received UL grant offset information, and control the transceiver to transmit an RRC connection setup complete message to the eNB through the allocated UL resources, and wherein the UL grant offset information is determined by taking into consideration processing delay indicated by a value of the UE capability type field.

15. A method for allocating uplink (UL) resources in a wireless communication system supporting a specific service, the method being performed by an evolved NodeB (eNB) and comprising:

receiving a radio resource control (RRC) connection request message comprising a UL resource request information element (IE) for requesting a UL resource grant from a user equipment (UE), the UL resource request IE comprising a UE capability type field associated with a point of time at which the eNB allocates UL resources to the UE;

determining a UL grant offset value indicative of the point of time at which the UL resources are allocated to the UE by taking into consideration processing delay indicated by a value of the received UE capability type field;

transmitting an RRC connection setup message comprising the determined UL grant offset value to the UE;

allocating the UL resources to the UE in the determined UL grant offset value; and receiving an RRC connection setup complete message from the UE through the allocated UL resources.

* * * * *